(12) United States Patent
Tang et al.

(10) Patent No.: US 12,027,811 B2
(45) Date of Patent: Jul. 2, 2024

(54) OCTAVE-SPANNING SOLITON COMB

(71) Applicant: YALE UNIVERSITY, New Haven, CT (US)

(72) Inventors: Hongxing Tang, Orange, CT (US); Xianwen Liu, New Haven, CT (US); Joshua Surya, New Haven, CT (US)

(73) Assignee: Yale University, New Haven, CT (US)

( * ) Notice: Subject to any disclaimer, the term of this patent is extended or adjusted under 35 U.S.C. 154(b) by 532 days.

(21) Appl. No.: 17/166,411

(22) Filed: Feb. 3, 2021

(65) Prior Publication Data

US 2021/0242654 A1 Aug. 5, 2021

Related U.S. Application Data

(60) Provisional application No. 62/969,581, filed on Feb. 3, 2020.

(51) Int. Cl.
*H01S 3/067* (2006.01)
*G02F 1/35* (2006.01)
*G02F 1/37* (2006.01)
*H01S 3/16* (2006.01)

(52) U.S. Cl.
CPC ........ *H01S 3/06754* (2013.01); *G02F 1/3528* (2021.01); *G02F 1/37* (2013.01); *H01S 3/06716* (2013.01); *H01S 3/1608* (2013.01); *G02F 1/3501* (2013.01); *G02F 1/3507* (2021.01); *G02F 1/3511* (2013.01); *G02F 1/3513* (2013.01); *G02F 2203/17* (2013.01)

(58) Field of Classification Search
None
See application file for complete search history.

(56) References Cited

U.S. PATENT DOCUMENTS

| | | | |
|---|---|---|---|
| 2018/0083599 A1* | 3/2018 | Kippenberg | H03H 9/462 |
| 2019/0312402 A1* | 10/2019 | Lucas | H01S 3/1053 |
| 2021/0096444 A1* | 4/2021 | Zhang | G02F 1/3536 |

OTHER PUBLICATIONS

Jung et al. "Optical frequency comb generation from aluminum nitride micro-ring resonator", online publication date Jul. 26, 2013; retrieved from /https://arxiv.org/ftp/arxiv/papers/1307/1307.6761.pdf, on Jul. 14, 2023. (Year: 2013).*

Sun et al. "High Quality Factor Aluminum Nitride on Sapphire Resonators at Infrared and Near Infrared Wavelengths", 2020 Conference on Lasers and Electro-Optics (CLEO), San Jose, CA, USA, May 2020, pp. 1-2 (Year: 2020).*

Yi, Xu, et al. "Single-mode dispersive waves and soliton microcomb dynamics." Nature communications 8.1 (2017): 1-9.

Yi, Xu, et al. "Soliton frequency comb at microwave rates in a high-Q silica microresonator." Optica 2.12 (2015): 1078-1085.

(Continued)

*Primary Examiner* — Eric L Bolda
(74) *Attorney, Agent, or Firm* — Riverside Law LLP

(57) ABSTRACT

The present invention provides octave-spanning optical frequency combs. The octave-spanning optical frequency combs employ microresonators having improved stability using a smaller form factor. In some embodiments, the octave-spanning optical frequency combs are fabricated using aluminum nitride (AlN). AlN is a more robust Kerr material for generating octave-spanning soliton comb (e.g., 1.5 octaves or more).

21 Claims, 24 Drawing Sheets

(56) References Cited

OTHER PUBLICATIONS

Yu, Mengjie, et al. "Coherent two-octave-spanning supercontinuum generation in lithium-niobate waveguides." Optics letters 44.5 (2019): 1222-1225.
Yu, Mengjie, et al. "Mode-locked mid-infrared frequency combs in a silicon microresonator." Optica 3.8 (2016): 854-860.
Yu, Su-Peng, et al. "Tuning Kerr-soliton frequency combs to atomic resonances." Physical Review Applied 11.4 (2019): 044017.
Zhang, Mian, et al. "Broadband electro-optic frequency comb generation in a lithium niobate microring resonator." Nature 568.7752 (2019): 373-377.
Zhang, Mian, et al. "Monolithic ultra-high-Q lithium niobate microring resonator." Optica 4.12 (2017): 1536-1537.
Zhang, Shuangyou, et al. "Terahertz wave generation using a soliton microcomb." Optics express 27.24 (2019): 35257-35266.
Bishop, Sam G., et al. "Room-temperature quantum emitter in aluminum nitride." ACS photonics 7.7 (2020): 1636-1641.
Brasch, Victor, et al. "Photonic chip-based optical frequency comb using soliton Cherenkov radiation." Science 351.6271 (2016): 357-360.
Briles, Travis C., et al. "Interlocking Kerr-microresonator frequency combs for microwave to optical synthesis." Optics letters 43.12 (2018): 2933-2936.
Bruch, Alexander W., et al. "17 000%/W second-harmonic conversion efficiency in single-crystalline aluminum nitride microresonators." Applied Physics Letters 113.13 (2018): 131102.
Bruch, Alexander W., et al. "On-chip χ (2) microring optical parametric oscillator." Optica 6.10 (2019): 1361-1366.
Bruch, Alexander W., et al. "Pockels soliton microcomb." Nature Photonics 15.1 (2021): 21-27.
Chang, Lin, et al. "Heterogeneously integrated GaAs waveguides on insulator for efficient frequency conversion." Laser & Photonics Reviews 12.10 (2018): 1800149.
Cole, Daniel C., et al. "Soliton crystals in Kerr resonators." Nature Photonics 11.10 (2017): 671-676.
Drake, Tara E., et al. "Terahertz-rate Kerr-microresonator optical clockwork." Physical Review X 9.3 (2019): 031023.
Fortier, Tara, and Esther Baumann. "20 years of developments in optical frequency comb technology and applications." Communications Physics 2.1 (2019): 1-16.
Gaeta, Alexander L., Michal Lipson, and Tobias J. Kippenberg. "Photonic-chip-based frequency combs." nature photonics 13.3 (2019): 158-169.
Giunta, Michele, et al. "20 years and 20 decimal digits: A journey with optical frequency combs." IEEE Photonics Technology Letters 31.23 (2019): 1898-1901.
Gong, Zheng, et al. "High-fidelity cavity soliton generation in crystalline AlN micro-ring resonators." Optics letters 43.18 (2018): 4366-4369.
Gong, Zheng, et al. "Near-octave lithium niobate soliton microcomb." Optica 7.10 (2020): 1275-1278.
Gong, Zheng, et al. "Photonic dissipation control for Kerr soliton generation in strongly Raman-active media." Physical Review Letters 125.18 (2020): 183901.
Gong, Zheng, et al. "Soliton microcomb generation at 2 um in z-cut lithium niobate microring resonators." Optics letters 44.12 (2019): 3182-3185.
Guo, Hairun, et al. "Universal dynamics and deterministic switching of dissipative Kerr solitons in optical microresonators." Nature Physics 13.1 (2017): 94-102.
He, Yang, et al. "Self-starting bi-chromatic LiNbO 3 soliton microcomb." Optica 6.9 (2019): 1138-1144.
Herr, T., et al. "Mode spectrum and temporal soliton formation in optical microresonators." Physical review letters 113.12 (2014): 123901.
Herr, Tobias, et al. "Temporal solitons in optical microresonators." Nature Photonics 8.2 (2014): 145-152.
Hickstein, Daniel D., et al. "Ultrabroadband supercontinuum generation and frequency-comb stabilization using on-chip waveguides with both cubic and quadratic nonlinearities." Physical Review Applied 8.1 (2017): 014025.
Jones, David J., et al. "Carrier-envelope phase control of femtosecond mode-locked lasers and direct optical frequency synthesis." Science 288.5466 (2000): 635-639.
Joshi, Chaitanya, et al. "Thermally controlled comb generation and soliton modelocking in microresonators." Optics letters 41.11 (2016): 2565-2568.
Karpov, Maxim, et al. "Raman self-frequency shift of dissipative Kerr solitons in an optical microresonator." Physical review letters 116.10 (2016): 103902.
Kippenberg, Tobias J., et al. "Dissipative Kerr solitons in optical microresonators." Science 361.6402 (2018).
Kneissl, Michael, et al. "The emergence and prospects of deep-ultraviolet light-emitting diode technologies." nature photonics 13.4 (2019): 233-244.
Li, Jiang, et al. "Electro-optical frequency division and stable microwave synthesis." Science 345.6194 (2014): 309-313.
Li, Qing, et al. "Stably accessing octave-spanning microresonator frequency combs in the soliton regime." Optica 4.2 (2017): 193-203.
Liu, X., Gong, Z., Bruch, A.W. et al. Aluminum nitride nanophotonics for beyond-octave soliton microcomb generation and self-referencing. Nat Commun 12, 5428 (2021). https://doi.org/10.1038/s41467-021-25751-9.
Liu, Xianwen, et al. "Beyond 100 THz-spanning ultraviolet frequency combs in a non-centrosymmetric crystalline waveguide." Nature communications 10.1 (2019): 1-8.
Liu, Xianwen, et al. "Generation of multiple near-visible comb lines in an AlN microring via $\chi(2)$ and $\chi(3)$ optical nonlinearities." Applied Physics Letters 113.17 (2018): 171106.
Liu, Xianwen, et al. "Integrated continuous-wave aluminum nitride Raman laser." Optica 4.8 (2017): 893-896.
Liu, Xianwen, et al. "Integrated high-Q crystalline AlN microresonators for broadband Kerr and Raman frequency combs." ACS Photonics 5.5 (2018): 1943-1950.
Liu, Xianwen, et al. "Ultra-high-Q UV microring resonators based on a single-crystalline AlN platform." Optica 5.10 (2018): 1279-1282.
Lu, Juanjuan, et al. "Periodically poled thin-film lithium niobate microring resonators with a second-harmonic generation efficiency of 250,000%/W." Optica 6.12 (2019): 1455-1460.
Lu, Tsung-Ju, et al. "Bright high-purity quantum emitters in aluminum nitride integrated photonics." ACS Photonics 7.10 (2020): 2650-2657.
Majkić, Aleksej, et al. "Optical nonlinear and electro-optical coefficients in bulk aluminium nitride single crystals." physica status solidi (b) 254.9 (2017): 1700077.
Newman, Zachary L., et al. "Architecture for the photonic integration of an optical atomic clock." Optica 6.5 (2019): 680-685.
Okawachi, Yoshitomo, et al. "Chip-based self-referencing using integrated lithium niobate waveguides." Optica 7.6 (2020): 702-707.
Pasquazi, Alessia, et al. "Micro-combs: A novel generation of optical sources." Physics Reports 729 (2018): 1-81.
Pfeiffer, Martin HP, et al. "Octave-spanning dissipative Kerr soliton frequency combs in Si 3 N 4 microresonators." Optica 4.7 (2017): 684-691.
Raja, Arslan S., et al. "Electrically pumped photonic integrated soliton microcomb." Nature communications 10.1 (2019): 1-8.
Spencer, Daryl T., et al. "An optical-frequency synthesizer using integrated photonics." Nature 557.7703 (2018): 81-85.
Stern, Brian, et al. "Battery-operated integrated frequency comb generator." Nature 562.7727 (2018): 401-405.
Surya, Joshua B., et al. "Control of second-harmonic generation in doubly resonant aluminum nitride microrings to address a rubidium two-photon clock transition." Optics letters 43.11 (2018): 2696-2699.
Waldburger, Dominik, et al. "Tightly locked optical frequency comb from a semiconductor disk laser." Optics express 27.3 (2019): 1786-1797.
Wilson, Dalziel J., et al. "Integrated gallium phosphide nonlinear photonics." Nature Photonics 14.1 (2020): 57-62.

(56) References Cited

OTHER PUBLICATIONS

Xiong, Chi, et al. "Aluminum nitride as a new material for chip-scale optomechanics and nonlinear optics." New Journal of Physics 14.9 (2012): 095014.

Xue, Xiaoxiao, et al. "Mode-locked dark pulse Kerr combs in normal-dispersion microresonators." Nature Photonics 9.9 (2015): 594-600.

Yang, Qi-Fan, et al. "Stokes solitons in optical microcavities." Nature Physics 13.1 (2017): 53-57.

* cited by examiner

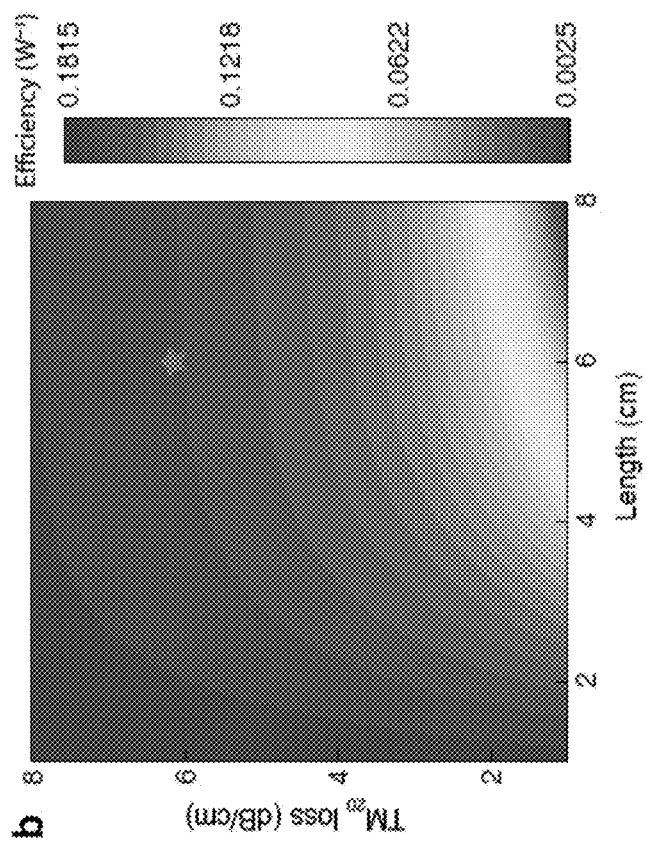
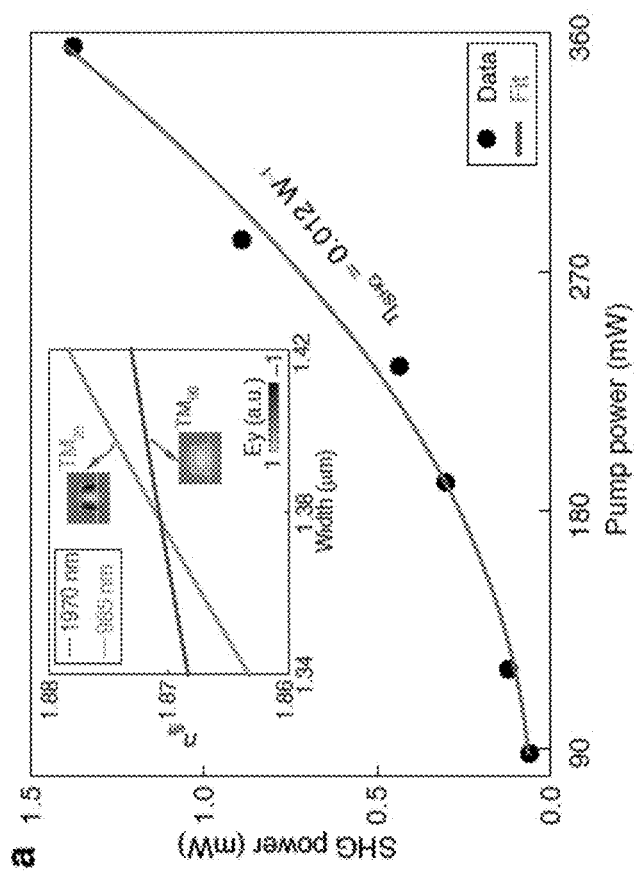
Figure 19

| | SiN | AlN |
|---|---|---|
| Intrinsic nonlinearity | $\chi^{(3)}$ | $\chi^{(3)}$ & $\chi^{(2)}$ |
| Second-harmonic doubling | × | √ |
| Electro-optic modulation | × | √ |
| Cladding | Air | $SiO_2$ |
| Dispersive waves | Two | Two |
| Pump wavelength (μm) | 1.06, 1.55 | 1.55 |
| Intrinsic Q-factors | $1.0 \times 10^6$ at 1.06 μm | $1.6 \times 10^6$ |
| On-chip pump power | ~200 mW | ~400 mW |
| Spectral span | 1.2-1.4 octave | 1.2-1.5 octave |
| Repetition rate (GHz) | 1000 | 434, 361, 216 |
| Material preparation | LPCVD | MOCVD |
| Result reproducible | Weak | Good |

Figure 24

OCTAVE-SPANNING SOLITON COMB

CROSS REFERENCE TO RELATED APPLICATIONS

This application claims priority to U.S. Provisional Patent Application No. 62/969,581 filed on Feb. 3, 2020, incorporated herein by reference in its entirety.

STATEMENT REGARDING FEDERALLY SPONSORED RESEARCH OR DEVELOPMENT

This invention was made with government support under W31P4Q-15-1-0006 awarded by the Defense Advanced Research Project Agency. The government has certain rights in the invention.

BACKGROUND

Silicon Nitride ($Si_3N_4$) is a commonly used optical frequency comb microresonator material, but it is a challenging material to reproducibly fabricate and deterministically launch octave-spanning soliton combs. Furthermore, the properties of $Si_3N_4$ impose physical limitations that require comb-locking to be performed off-chip, which not only introduces loss but also adds system complexity.

Optical frequency combs, originally developed from solid-state or fiber based mode-locked lasers, have evolved into photonic-chip-based sources that are compact, robust and power efficient. Among various chipscale schemes, microresonator Kerr frequency combs ("microcombs" hereafter) are of particular interest because of their high scalability for photonic integration. Indeed, substantial efforts have been made towards soliton mode-locking, allowing phase coherent microcombs on the one hand and unveiling rich soliton physics on the other hand. Specifically, octave-spanning soliton microcombs permit phase locking of the carrier-envelop offset (CEO) frequency ($f_{ceo}$) via well-known f–2f interferometry, and are prerequisite for chip-scale implementation of precision metrology, frequency synthesizers and optical clocks. To date, silicon nitride ($Si_3N_4$) nanophotonics has proved viable for octave soliton operations with a terahertz repetition rate ($f_{rep}$). Nevertheless, such a large $f_{rep}$ is not amenable for direct photodetection and poses challenges to access the CEO frequency with a value up to $f_{rep}$. In the meantime, the lack of intrinsic quadratic $x^{(2)}$ nonlinearities in $Si_3N_4$ films typically requires an external frequency doubler and off-chip optical circuitry for deriving the CEO frequency. These off-chip optical components compromise the scaling advantage of microcombs and significantly set back self-locked microcombs for portable applications.

Thus, there is a need in the art for improved optical frequency combs. This invention satisfies this unmet need.

SUMMARY

In one aspect, the present invention provides an octave-spanning optical frequency comb device, comprising: an optical pathway having at least one entry and at least one exit; at least one laser source positioned at the at least one entry; and at least one micro ring resonator positioned adjacent to the optical pathway between the at least one entry and the at least one exit, wherein the at least one micro ring resonator comprises aluminum nitride (AlN).

In one embodiment, the at least one laser source is a continuous wave (CW) laser. In one embodiment, the optical pathway further comprises a suppressed carrier single sideband modulator (SC-SSBM) positioned between the at least one laser source and the at least one micro ring resonator. In one embodiment, the optical pathway further comprises an amplifier positioned between the at least one laser source and the at least one micro ring resonator. In one embodiment, the filter is an erbium-doped fiber amplifier (EDFA). In one embodiment, the optical pathway further comprises a fiber polarization controller (FPC) positioned between the at least one laser source and the at least one micro ring resonator.

In one embodiment, the at least one micro ring resonator comprises an oxide cladding. In one embodiment, the oxide cladding is silicon oxide. In one embodiment, the at least one micro ring resonator comprises a ring width and a ring radius. In one embodiment, the ring width is between about 0.5 μm to about 100 μm. In one embodiment, the ring radius is between about 10 μm to about 1000 μm.

In one embodiment, the at least one micro ring resonator is fabricated by chemical vapor deposition of an AlN thin film on a substrate. In one embodiment, the chemical vapor deposition is metalorganic chemical vapor deposition (MOCVD). In one embodiment, the substrate is sapphire. In one embodiment, the AlN thin film comprises at least 0.5% thickness uniformity. In one embodiment, the AlN thin film comprises an annealing temperature of about 1700° C.

In one embodiment, the device comprises an intrinsic optical Q factor of at least 3,000,000. In one embodiment, the at least one micro ring resonator comprise a ring width of 2.5 μm, a ring radius of 60 μm, a repetition frequency $f_{rep}$ of 362 GHz, and a comb span of 1.2 octave In one embodiment, the at least one micro ring resonator comprise a ring width of 3.3 μm, a ring radius of 100 μm, a repetition frequency $f_{rep}$ of 216.5 GHz, and a comb span of 1.1 octave. In one embodiment, the comb span is at least 1.5 octaves. In one embodiment, the device further comprises an electro-optical comb for repetition comprising a waveguide in resonance with the at least one microring resonator, at least one frequency second harmonic generation doubler, and a racetrack resonator.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements.

FIG. 19 shows example experimental data on SHG conversion efficiency in accordance with some embodiments.

FIG. 24 is a table comparing properties of AlN to SiN for use in the device in accordance with some embodiments.

DETAILED DESCRIPTION

Definitions

Figure 1:
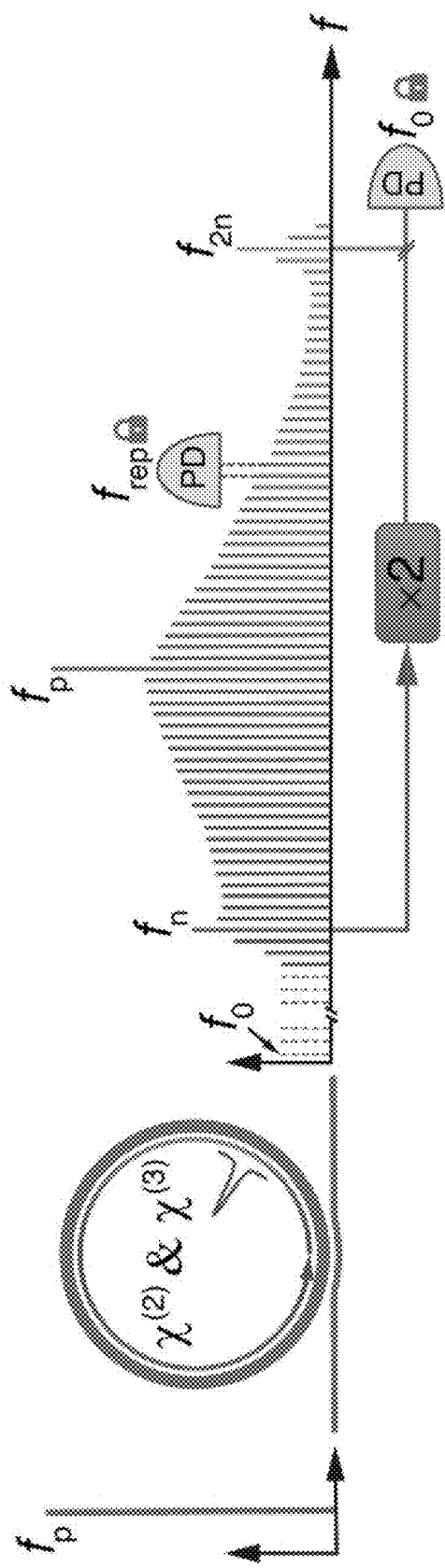
FIG. 1 is a basic schematic representation of a single on-chip stabilized locked microcomb and its output in accordance with some embodiments.

Unless defined otherwise, all technical and scientific terms used herein have the same meaning as commonly understood by one of ordinary skill in the art to which this invention belongs.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate to perform the disclosed methods.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

DESCRIPTION

The present invention provides octave-spanning optical frequency combs. Frequency microcombs, successors to mode-locked laser and fiber combs, enable miniature rulers of light for applications including precision metrology, molecular fingerprinting, and exoplanet discoveries. To enable frequency ruling functions, microcombs must be stabilized by locking their carrier-envelop offset frequency. So far, the microcomb stabilization remains compounded by the elaborate optics external to the chip, thus evading its scaling benefit. To address this challenge, the present invention provides a nanophotonic chip solution based on aluminum nitride thin films, which simultaneously offer optical Kerr nonlinearity for generating octave soliton combs and Pockels nonlinearity for enabling heterodyne detection of the offset frequency. The agile dispersion control of crystalline III-Nitride photonics permits high-fidelity generation of solitons with features including 1.5-octave spectral span, dual dispersive waves, and sub-terahertz repetition rates down to 220 gigahertz. These attractive characteristics, aided by on-chip phase-matched aluminum nitride waveguides, allow the full determination of the offset frequency.

The octave-spanning optical frequency combs employ microresonators having improved stability using a smaller form factor. In some embodiments, the octave-spanning optical frequency combs are fabricated using aluminum nitride (AlN). AlN is a more robust Kerr material for generating octave-spanning soliton comb (e.g., 1.5 octaves or more). AlN is also a strong Pockels ($x^2$) material offering on-chip doubling for carrier-envelope-offset frequency ($f_{ceo}$) locking. The $X^2$ effect of AlN permits on chip electro-optic modulation for repetition frequency ($f_{rep}$) locking. $f_{rep}$ of AlN octave-spanning optical frequency combs can be as low as 216 GHz as opposed to 1 THz $f_{ceo}$ offered by $Si_3N_4$. Direct photodetection of $f_{rep}$ is also possible using AlN octave-spanning optical frequency combs. Additional materials contemplated herein include $LiNbO_3$.

In some embodiments, octave-spanning optical frequency combs are fabricated using chemical vapor deposition to deposit single crystalline AlN thin films onto a substrate. In some embodiments, metalorganic chemical vapor deposition (MOCVD) is used for high throughput film growth. The substrate can comprise any suitable material, such as sapphire. The AlN thin film can be screened and its thickness mapped. Dispersion modeling can be performed using thickness data to achieve flattened anomalous dispersion over a broad bandwidth in devices of appropriate geometries. The fabrication methods can control the thin film nanometer thickness by epitaxial growth (with at least 0.5% thickness uniformity). AlN also permits high temperature annealing (up to 1700° C. as opposed to 1100° C. of $Si_3N_4$) for optimization of optical Q factor. Intrinsic optical Q factors of over 3,000,000 are routinely achievable (wherein loaded Q factors are over 1,000,000).

In some embodiments, the octave-spanning optical frequency combs are clad and protected with an oxide layer, such as silicon oxide. In some embodiments, the dispersive features can be tuned continuously up to at least 1.5-octave separation. In some embodiments, the microresonators have a ring shape with an overall ring radius and a ring thickness or width. In some embodiments, the microresonators can have any suitable geometry for self-locking. For example, microresonator width can range between about 0.5 μm wide to 100 μm wide microresonator rings. Microresonator radius can range between about 10 μm to about 1000 μm. In one embodiment, 2.5 μm wide microresonator rings are fabricated with a radius of 60 μm, $f_{rep}$=362 GHz, and a comb span of 1.2 octave; THz comb is not required. In one embodiment, 3.3 μm wide microresonator rings are fabricated with a radius of 100 μm, $f_{rep}$=216.5 GHz, and a comb span of 1.1 octave. In various embodiments, $f_{rep}$ is directly detectable. For example, $f_{rep}$ can be directly detectable at $f_{rep}$ below 500 GHz, below 200 GHz, or below 100 GHz. Phase modulators are optional or can be replaced with additional microring modulators with microheaters to increase efficiency. In one embodiment, $f_{ceo}$ detection S/N=700 assuming 17000%/W efficiency, −30 dBm if power and −35 dBm 2f power.

Micro-comb self-locking was achieved without using off-chip doublers and phase modulators. Sustained operations were achieved due to the high stability of the AlN films. AlN has quadratic optical nonlinearity which allows self-locking of the comb by on-chip construction of 1f–2f interferometer to access carrier envelope frequency and on-chip implementation phase modulators to access free spectral ranges. In short, AlN provides a single chip solution to self-locked comb whereas $Si_3N_4$ could not.

In some embodiments, the optical frequency combs of the present invention are applicable in enhanced precision optical clocks, spectroscopy sensing, extremely high speed and high bandwidth data transmission, and astrocomb applications.

III-Nitride semiconductors such as aluminum nitride (AlN) exhibit a non-centrosymmetric crystal structure, thereby possessing inherent optical $X^2$) nonlinearity as well as Pockels electro-optic and piezoelectric properties. Apart from the advances in ultraviolet light emitting diodes and quantum emitters, AlN has also proved viable for low-loss nanophotonics in high efficiency second-harmonic generation (SHG) and high-fidelity Kerr and Pockels soliton mode-locking. Therefore, it is feasible to establish an on-chip f–2f interferometer provided that an octave AlN soliton microcomb is available. This solution is favored when compared with the heterogeneous integration approach, such as a device based on hybrid gallium arsenide (GaAs)/$Si_3N_4$ waveguides. Despite that on-chip $f_{ceo}$ detection was achieved from supercontinua driven by a femtosecond laser in non-resonant $X^2$) nanophotonic waveguides made from AlN or lithium niobate (LN) thin films, resonator microcomb-based f–2f interferometry using nanophotonics remains elusive.

Disclosed is a high-fidelity generation of octave soliton microcombs and subsequent $f_{ceo}$ detection using AlN-based nanophotonic chips. Thanks to mature epitaxial growth, AlN thin films with highly uniform thickness are available, thus permitting lithographic control of group velocity dispersion (GVD) for comb spectral extension via dispersive wave (DW) emissions. The octave soliton microcombs possess separated dual DWs and moderate $f_{rep}$ of 433, 360 and 220 gigahertz, and are found to be reproducible from batch-to-batch fabrications. The results permit the capture of the f–2f beatnote through on-chip SHG in phase-matched AlN waveguides. This work establishes the great potential of non-centrosymmetric III-Nitride photonic platforms for portable self-locked microcomb sources.

FIG. 1 is a basic schematic representation of a single on-chip stabilized locked microcomb and its output. The device is an octave spanning soliton comb and provides on-chip f–2f interferometric locking of $f_{ceo}$ and direct detection of $f_{ceo}$.

Figure 2:
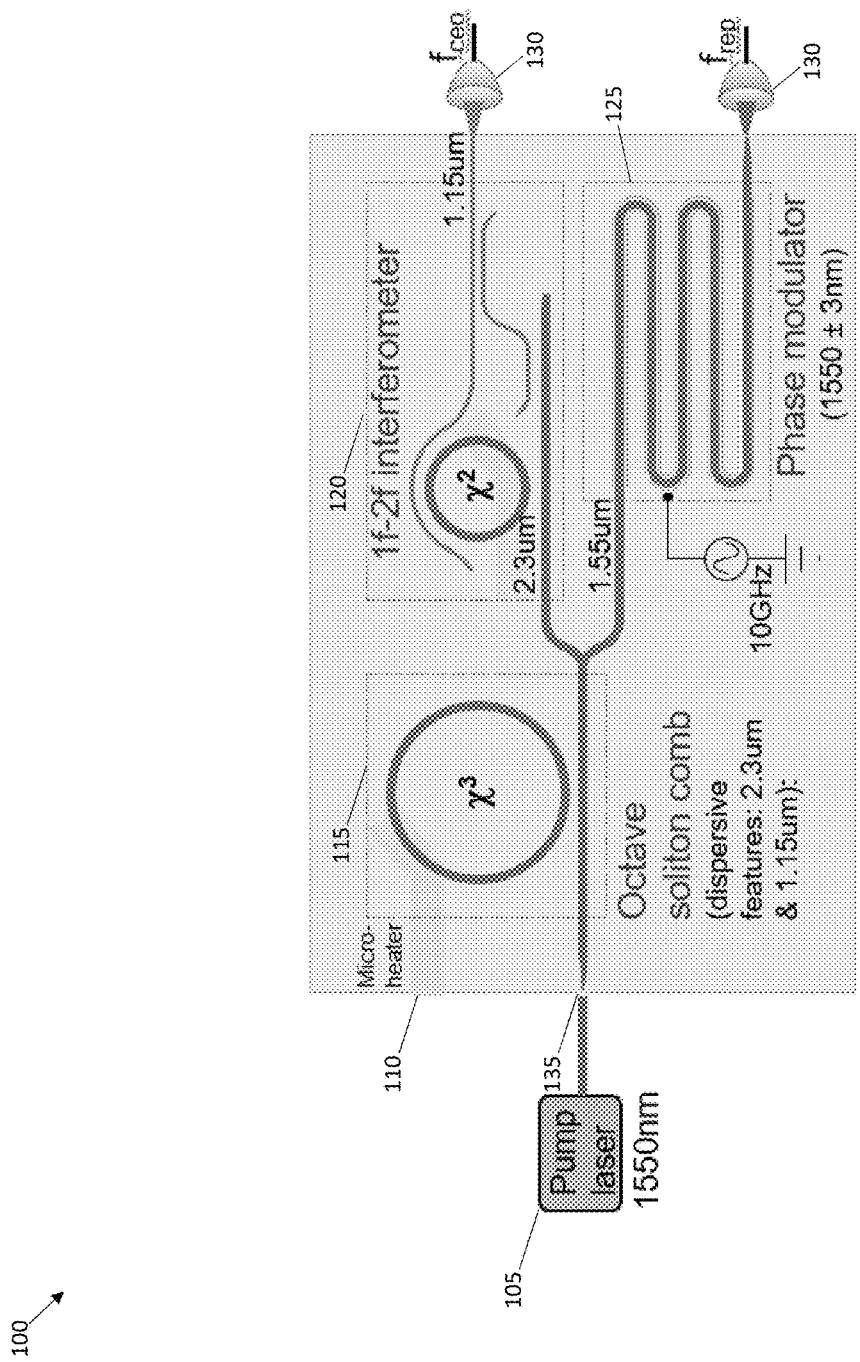
FIG. 2 is a schematic representation of octave-spanning optical frequency comb device in accordance with some embodiments.

FIG. 2 is a schematic representation of octave-spanning optical frequency comb device 100. The device design achieves a single-chip realization of a $f_{ceo}$ and $f_{rep}$ locked AlN microcomb. The device includes a laser source 105, a micro-heater 110, a micro ring resonator 115 (also referred to herein as a microring resonator and an octave soliton comb), a 1f–2f interferometer 120, a phase modulator 125, detectors 130, and an optical pathway 135 having at least one entry and at least one exit.

In one embodiment the laser 105 is positioned at the at least one entry of the optical pathway 135. In one embodiment, the micro ring resonator 115 is positioned adjacent to the optical pathway 135 between the at least one entry and the at least one exit. In one embodiment, the micro ring resonator 115 comprises aluminum nitride (AlN). In one embodiment, the micro ring resonator 115 comprises $LiNbO_3$. In one embodiment, the laser source is a continuous wave (CW) laser. In one embodiment, the optical pathway 135 further comprises a suppressed carrier single sideband modulator (SC-SSBM) positioned between the at least one laser source 105 and the at least one micro ring resonator 115.

In one embodiment, the device 100 further includes a filter. In one embodiment, the filter is an erbium-doped fiber amplifier (EDFA). In one embodiment, the optical pathway 135 further comprises a fiber polarization controller (FPC) positioned between the at least one laser source 100 and the at least one micro ring resonator 115. In one embodiment, the at least one micro ring resonator 115 comprises an oxide cladding. In one embodiment, the oxide cladding is silicon oxide.

In one embodiment, the at least one micro ring resonator 115 comprises a ring width and a ring radius. In one embodiment, the ring width is between about 0.5 μm to about 100 μm. In one embodiment, the ring radius is between about 10 μm to about 1000 μm. In one embodiment, the at least one micro ring resonator 115 is fabricated by chemical vapor deposition of an AlN thin film on a substrate. In one embodiment, the chemical vapor deposition is metalorganic chemical vapor deposition (MOCVD). In one embodiment, the substrate is sapphire. In one embodiment, the AlN thin film comprises at least 0.5% thickness uniformity. In one embodiment, wherein the AlN thin film comprises an annealing temperature of about 1700° C.

In one embodiment, the device 100 comprises an intrinsic optical Q factor of at least 3,000,000. In one embodiment, the at least one micro ring resonator 115 comprises a ring width of 2.5 μm, a ring radius of 60 μm, a repetition frequency $f_{rep}$ of 362 GHz, and a comb span of 1.2 octave. In one embodiment, the at least one micro ring resonator 115 comprises a ring width of 3.3 μm, a ring radius of 100 μm, a repetition frequency $f_{rep}$ of 216.5 GHz, and a comb span of 1.1 octave. In one embodiment, the comb span is at least 1.5 octaves. In one embodiment, the device further comprises an electro-optical comb for repetition comprising a waveguide in resonance with the at least one microring resonator, at least one frequency second harmonic generation doubler, and a racetrack resonator.

If $f_{rep}$ is pushed to below about 100 GHz, direct detection of $f_{rep}$ is possible, and the phase modulator 125 can be eliminated. Additionally, the phase modulator 125 can be replaced with microring modulators with microheater integration for higher efficiency. In one embodiment, the detectors 130 are InGaAs detectors. In one embodiment the $f_{ceo}$ has a S/N of about 700, assuming 17000%/W efficiency, −30 dBm 1f power, and −35 dBm 2f power.

Figure 3:
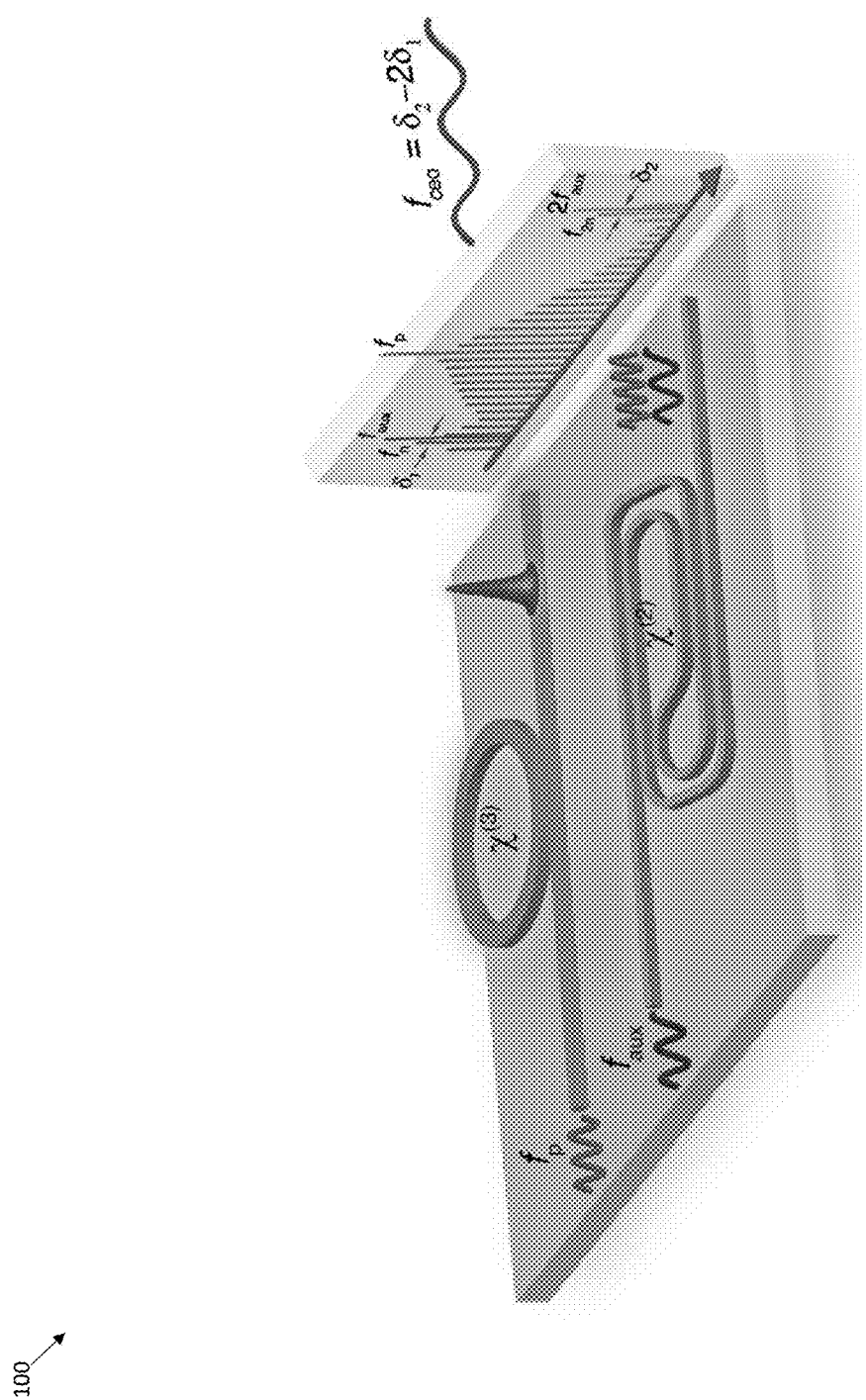
FIG. 3 shows an illustration of f–2f interferometry using octave-spanning soliton microcombs and second-harmonic generators in a nanophotonic platform harboring simultaneous $X^{(3)}$ and $X^{(2)}$ susceptibilities in accordance with some embodiments.

FIG. 3 shows an illustration of f–2f interferometry using octave-spanning soliton microcombs and second-harmonic generators in a nanophotonic platform harboring simultaneous $X^{(3)}$ and $X^{(2)}$ susceptibilities. The offset frequency $f_{ceo}$ is accessible from the beatnotes of $\delta_1$ and $\delta_2$, and $f_p$ is the pump laser frequency. The strategy is to leverage non-centrosymmetric photonic media for simultaneous integration of $X^{(3)}$ octave soliton microcombs and $X^{(2)}$ SHG doublers. For a proof-of-principle demonstration, an auxiliary laser (at $f_{aux}$) was adopted to obtain sufficient SHG power (at $2f_{aux}$) from phase-matched optical waveguides. The use of the auxiliary laser can be eliminated by exploiting microring-based architecture to boost the SHG efficiency. By subsequently beating $f_{aux}$ and $2f_{aux}$ with the $f_n$ and $f_{2n}$ comb lines at their corresponding beatnotes of $\delta_1$ and $\delta_2$, thefceo signal reads:

$$f_{ceo}=\delta_2-2\delta_1 \quad (1)$$

In certain embodiments, AlN thin films were epitaxially grown on a c-plane sapphire substrate via metal-organic chemical vapor deposition.

Figure 4:
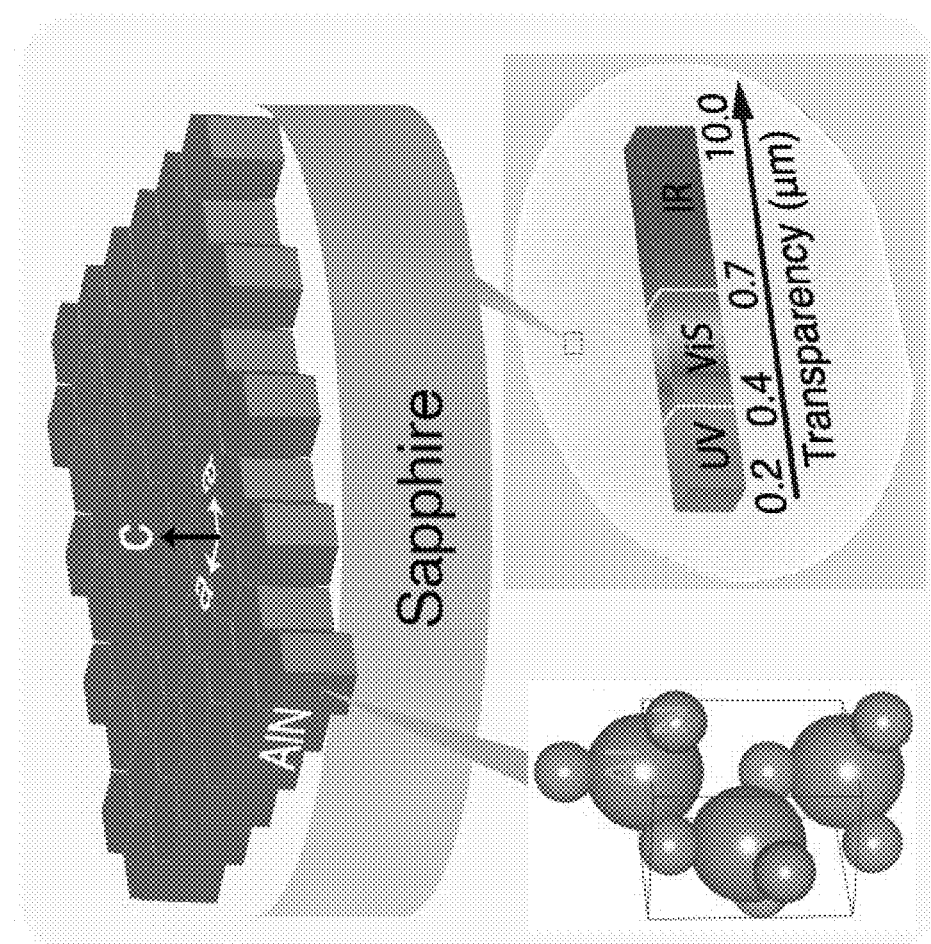
FIG. 4 shows a sketch of a hexagonal AlN layer in accordance with some embodiments.

FIG. 4 shows a sketch of a hexagonal AlN layer with lattice constants: a and c, epitaxially grown on a c-plane sapphire substrate, the unit cell of an AlN crystal, and photograph image of a 2-inch AlN wafer featuring a broad transparency window from ultraviolet to mid-infrared regimes. The AlN crystals exhibit a hexagonal wurtzite structure with a unit cell shown in the bottom, highlighting the non-centrosymmetry. Also shown is a 2 inch AlN-on-sapphire wafer featuring a broadband transparency and a favored film thickness, see FIG. 7, both of which are crucial factors to ensure octave GVD control. Great attention was also paid to the film crystal quality and surface roughness for low-loss photonic applications. The AlN nanophotonic chips were manufactured following electron-beam lithography, chlorine-based dry etching and silicon dioxide ($SiO_2$) coating processes and were subsequently cleaved to expose waveguide facets. The intrinsic optical quality factors ($Q_{int}$) of the AlN resonators were characterized to be ~1-3 million depending on the waveguide geometries. The detailed film and device characterization is presented in the Experimental Results section.

Since wurtzite AlN manifests optical anisotropy for vertically or horizontally-polarized light, the waveguide structures were engineered for optimal operation of fundamental transverse magnetic ($TM_{00}$) modes, which allows the harness of its largest $X^{(2)}$ susceptibility to ensure high-efficiency SHG. To expand microcomb spectra out of the anomalous GVD restriction, soliton-induced DW radiation was exploited by tailoring the resonator's integrated dispersion ($D_{int}$):

$$D_{int} = \frac{D_2}{2!}\mu^2 + \frac{D_3}{3!}\mu^3 + \sum_{i\geq 4}\frac{D_i}{i!}\mu^i \quad (2)$$

where $D_2$, $D_3$, and $D_i$ are $i_{th}$-order GVD parameters, while µindexes the relative azimuth mode number with respect to the pump (µ=0).

Figure 5:
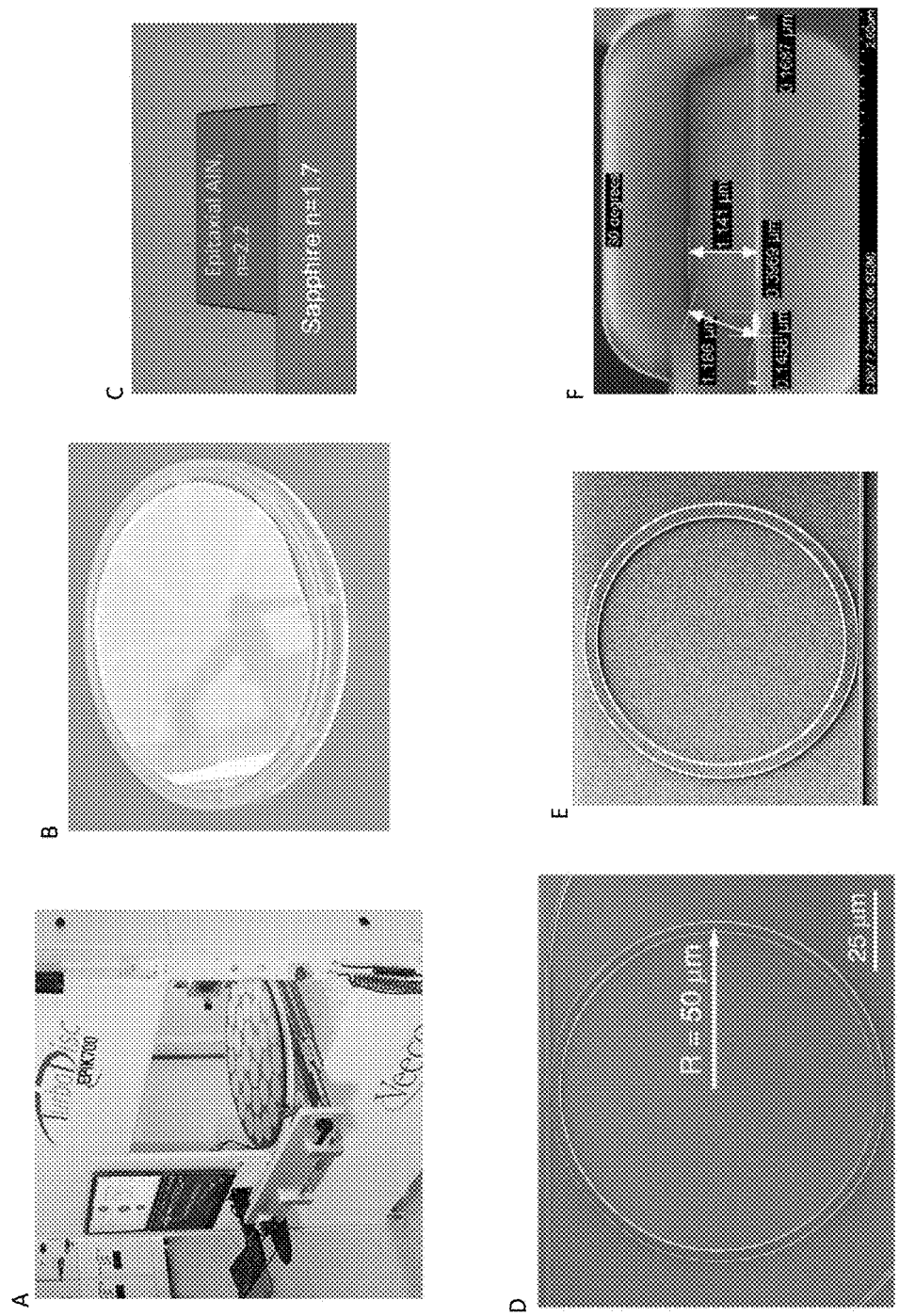
FIG. 5 shows an example process flow for manufacturing an AlN microcomb resonator device in accordance with some embodiments.

FIG. 5 shows an example process flow for manufacturing an AlN octave-spanning optical device 100 including a microring resonator 115 (octave soliton comb). Section A shows a MOCVD which provides high throughput growth. Section B is an example of the thin film produced by the MOCVD. Section C is a schematic representation of the cross section of the microcomb resonator. Sections D and E show images of example microcomb resonators. Section F shows a cross section image of an example microcomb resonator. By utilizing the process of epitaxial growth, the thickness can be controlled at a nanometer level with better that 0.5% thickness uniformity. High temperature annealing up to 1700° C., as opposed to 1100° C. for SiN, provides better optimization of optical Q. An intrinsic Q greater than 3,000,000 (loaded Q greater than 1,000,000) is easily achievable. Additionally, the devices 100 are not air cladded, but cladded with oxide instead, leading to longer expected lifetime.

Figure 6:
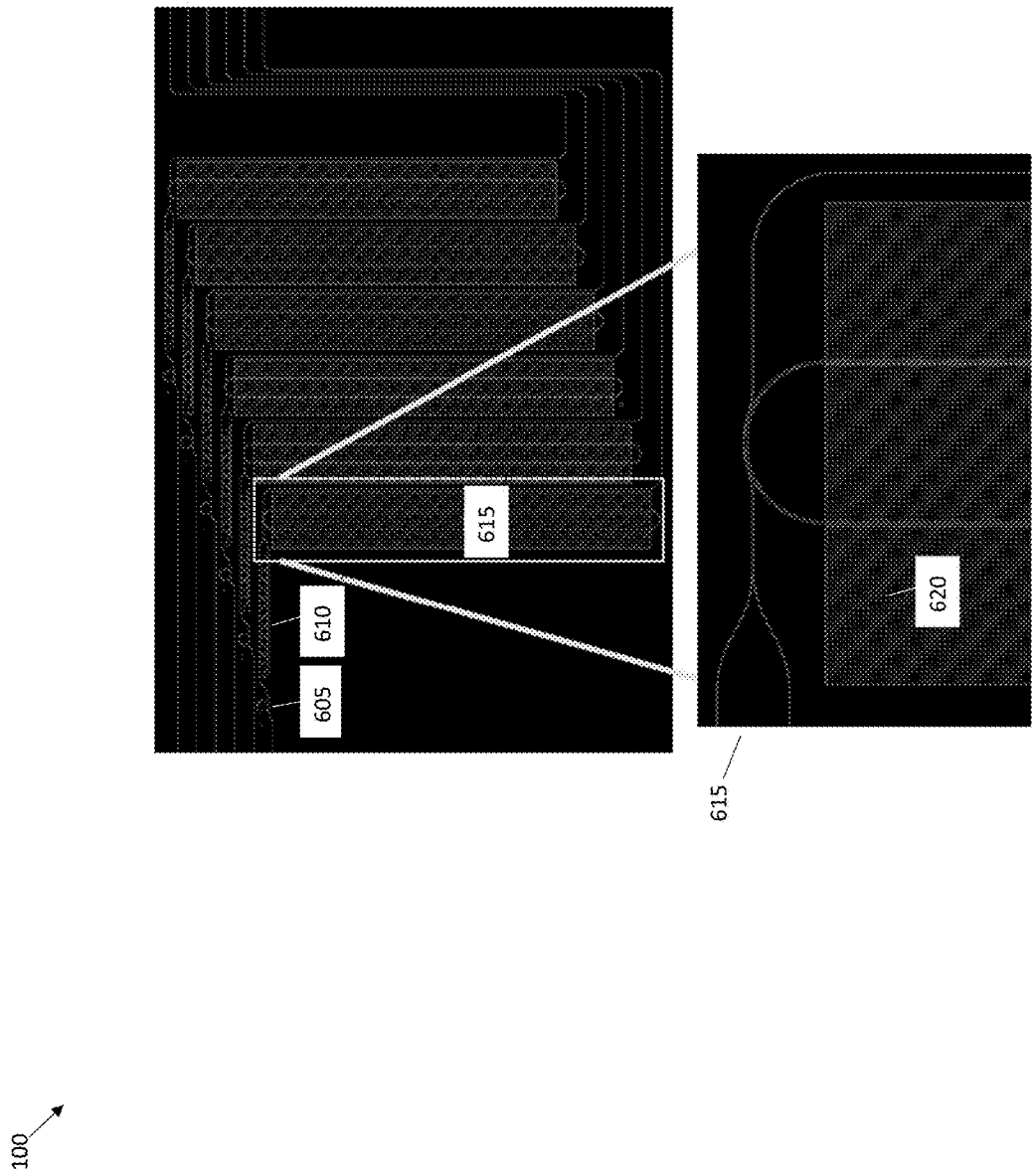
FIG. 6 shows an example embodiment of the electro-optic comb device in accordance with some embodiments.

FIG. 6 shows an example embodiment of the electro-optic comb device 100 for repetition. The sequence of events which leads to ultimately the self-referenced locking of an octave spanning soliton comb is as follows. First, input light enters the waveguide from the left edge of the chip which is in resonance with the first microring resonator 605. A soliton comb is achieved from the microring resonator 605 and the carrier envelope offset frequency signal is generated by the cascade of frequency second harmonic generation doublers 610. Finally, the repetition rate of the soliton comb is stabilized by the beat-note between an electro-optic frequency comb generated from the race-track resonator 615. The basic working principle of the racetrack resonator electro-optic comb is that a microwave signal sent to the device through the electrodes 620, will modulate the light that is in resonance of the racetrack resonator 615. The modulation is possible due to the z-directional electric field (into and out of the plane of the figure) allowed by the design of the electrodes 620, which is situated directly on top of the waveguide as well as next to the waveguides as shown in the enlarged display of the top section of the racetrack resonator. Since the resonators for soliton generation, carrier envelope offset frequency detection as well as repetition rate locking share the same bus waveguide, locking of an octave spanning soliton is made possible using one single compact device. To further demonstrate this configuration's compactness, multiple of these devices are shown in FIG. 6.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Figure 7:
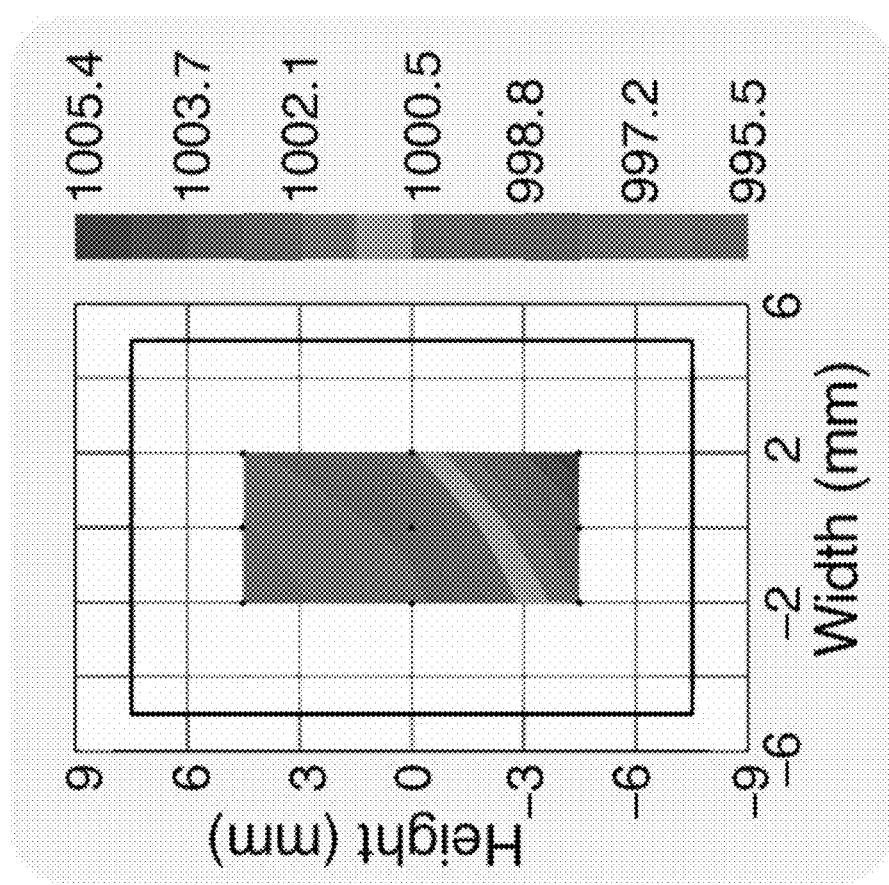
FIG. 7 shows a spectroscopic ellipsometer mapping of the AlN film thickness of an example device in accordance with some embodiments.

The following description details example experimental data and structures of the present invention. FIG. 7 shows a spectroscopic ellipsometer mapping of the AlN film thickness of an example device 100 in a region of 4×9 mm², showing a minor variation of 1000±5 nm denoted by the right color bar.

Figure 8:
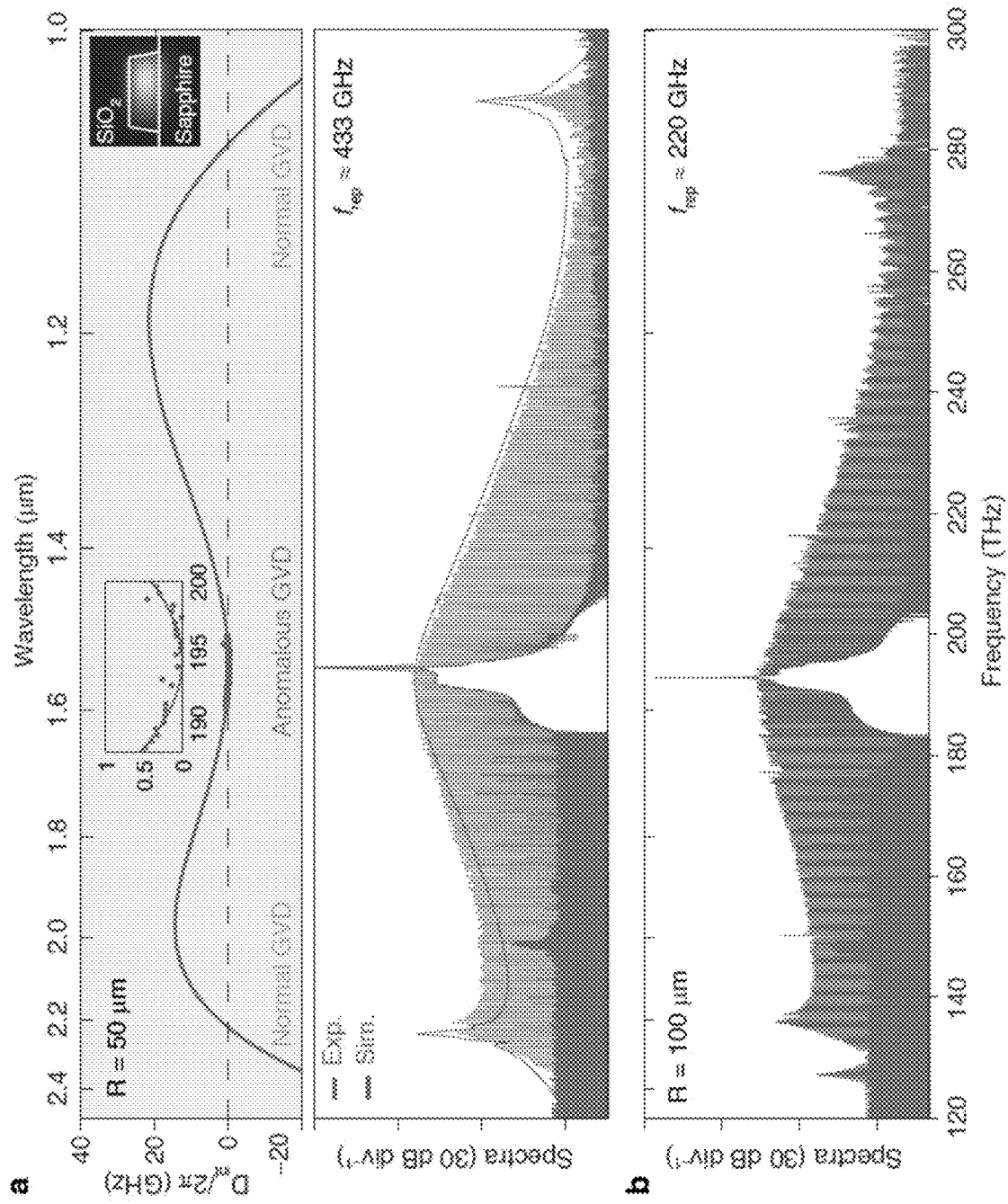
FIG. 8 shows example experimental data for octave soliton microcombs at hundreds of gigahertz repetition rates in accordance with some embodiments.

FIG. 8 shows example experimental data for octave soliton microcombs at hundreds of gigahertz repetition rates. The top panel of FIG. 8 section A shows the integrated dispersion ($D_{int}$) of a 50 μm-radius AlN resonator (cross section: 1.0×2.3 μm²), where the anomalous and normal GVD regimes are shaded with light blue and orange colors respectively, and the insets show a zoom-in view of the measured (red dots) and simulated (blue curve) values and the resonator modal profile shown in the right. The bottom panel of FIG. 8 section A shows a soliton microcomb spectra from the experiment (blue) and simulation (red) at an on-chip pump power of ~390 mW. The resonator $Q_{int}$ is 1.6 million and the $f_{rep}$ is estimated to be around 433 GHz. FIG. 8 section B shows a soliton microcomb spectrum from a 100 μm-radius AlN resonator (cross section: 1.0×3.5 μm²) with a decreased $f_{rep}$ of ~220 GHz. The applied pump power is ~1 W at a resonator $Q_{int}$ of 3.0 million.

The GVD engineered AlN resonators are coated with a $SiO_2$ protection layer, making it less susceptible to the ambient compared with the air cladded $Si_3N_4$ counterpart. An example of the resonator modal profile is shown in the inset of FIG. 8 section A. The top panel of FIG. 8 section A plots the $D_{int}$ curve from a 50 μm-radius AlN resonator through numerical simulation. In spite of the limited anomalous GVD window (light blue shade), octave microcomb operation is feasible via DW radiations at phase-matching conditions $D_{int}=0$, allowing for spectral extension into normal GVD regimes (light orange shade). Note that the occurrence of such dual DWs benefits from the optimal film thickness in the AlN system, while the DW separation is agilely adjustable over one octave through the control of resonator's dimensions. Around the telecom band, the $D_{int}$ value (red dots) was characterized by calibrating the resonator's transmission with a fiber-based Mach-Zehnder interferometer. The experimental result matches well with the simulated one (inset of FIG. 8 Section A) with an extracted $D_2/2\pi$ of ~6.12 MHz.

Soliton mode-locking was then explored based on a rapid frequency scan scheme to address the abrupt intracavity thermal variation associated with transitions into soliton states. The soliton spectrum is recorded using two grating-based optical spectrum analyzers (OSAs, coverage of 350-1750 nm and 1500-3400 nm). The bottom panel of FIG. 8 section A plots the soliton spectrum from a 50 μm-radius AlN resonator, featuring a moderate $f_{rep}$ of 433 GHz and an observable spectral span of 1.05-2.4 μm, exceeding one optical octave. Meanwhile, soliton induced DW radiations occur at both ends of the spectrum, in agreement with the predicted $D_{int}$ curves. Note that the low-frequency DW location matches well with the $D_{int}=0$ position, while the high-frequency one exhibits an evident blue shift, which is ascribed to Raman-induced soliton red shifts relative to the pump frequency. This conclusion is supported by the soliton spectral simulation (red curve) when accounting for Raman effects, while the intact low-frequency DW might be a result of the cancellation of soliton recoils.

The single crystal nature of AlN thin films permits reproducible optical index in each manufacture run. This, in combination with their uniform film thickness control, leads to a high predictability for the dispersion engineering, making it feasible to predict octave soliton combs at various repetition rates. For instance, the GVD model indicates that octave spectra with repetition rates further decreased by two times are anticipated from 100 μm-radius AlN resonators at optimal widths of 3.3-3.5 μm. FIG. 8 Section B plots the recorded soliton comb spectrum at a resonator width of 3.5 μm, where a $f_{rep}$ of ~220 GHz and dual DWs separated by more than one octave are achieved simultaneously. Such a low $f_{rep}$ is amenable for direct photodetection with state-of-the-art unitravelling-carrier photodiodes. A weak sharp spectrum occurred around 130 THz, which might arise from modified local GVD due to avoided mode crossing. In the nanophotonic platform, resonator geometries could be further predicted for achieving octave solitons with an electronically detectable $f_{rep}$ of ~109 GHz. Nonetheless, the strong competition between Kerr nonlinearities and stimulated Raman scattering (SRS) must be taken into account since the free spectrum range (FSR) of the resonator is already smaller than the $A^{TO}_1$ phonon linewidth (~138 GHz) in AlN crystals.

Figure 9:
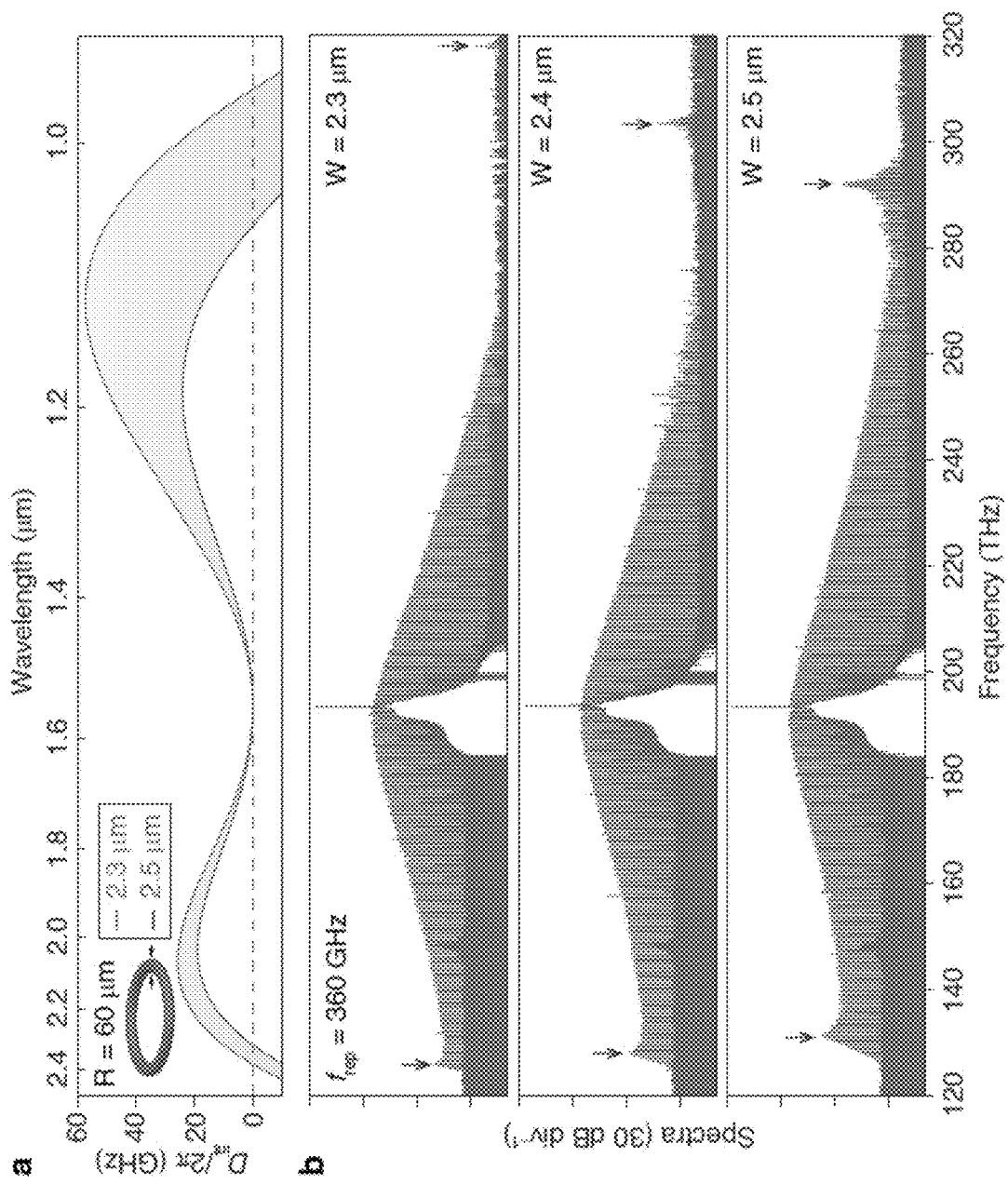
FIG. 9 shows example experimental data for octave soliton microcombs with agilely tunable spectra in accordance with some embodiments.

FIG. 9 shows example experimental data for octave soliton microcombs with agilely tunable spectra. FIG. 9 section A shows engineered $D_{int}$ curves of 60 μm-radius AlN resonators at varied widths of 2.3-2.5 μm revealed by the colored shadow regime. FIG. 9 section B shows corresponding soliton microcomb spectra at resonator widths of 2.3, 2.4, and 2.5 μm from the top to bottom panel, respectively. The $f_{rep}$ is ~360 GHz, while the vertical arrows in spectral wings indicate the emergence of DWs. Akin to FIG. 8, high-frequency DWs here also exhibit an evident blue shift from the $D_{int}=0$ position. From a $sech^2$ fit, the corresponding temporal pulse duration is estimated to be ~23, 22 and 19fs (from top to bottom), respectively.

Since the SHG from the auxiliary laser (1940-2000 nm) available in the laboratory is beyond the soliton spectral coverage shown in FIG. 8, the resonator dimensions were further adjusted for extending microcomb spectra below 1 μm. As plotted in FIG. 9 section A, the phase-matching condition ($D_{int}=0$) for high-frequency DW radiations below 1 μm is fulfilled by elevating the resonator radius to 60 μm while maintaining its width around 2.3 μm. In the meantime, low-frequency DWs could also be expected and their spectral separation is adjustable by controlling the resonator width. Guided by the tailored $D_{int}$ curves, the AlN resonators were fabricated and recorded octave soliton spectra at a $f_{rep}$ of ~360 GHz (see FIG. 9 section B). Lithographic control of DW radiations (indicated by vertical arrows) is also verified by solely adjusting the resonator width, allowing the spectral extension below 1 μm (width of 2.3 or 2.4 μm). The low- and high-frequency DWs are found to exhibit distinct frequency shifting rates, consistent with the $D_{int}$ prediction. The observable soliton spectra (from top to bottom of FIG. 9 section B) cover 1.5, 1.3, and 1.2 optical octaves by normalizing the total span ($\Delta f$) to its beginning frequency ($f_1$), that is $\Delta f/f_1$. Such a definition permits a fair comparison among soliton microcomb generation in distinct pump regimes across different material platforms, suggesting high competitiveness of the AlN microcomb span comparing to state-of-the-art values reported in $Si_3N_4$ microresonators.

The co-integration of SHG was then explored based on the $X^2$ susceptibility of AlN for matching the DW peak below 1 μm (middle panel of FIG. 9 section B). To fulfill the demanding requirement of spectral overlaps with the microcomb, a straight waveguide configuration was adopted, which allows a broader phase-matching condition albeit at the cost of reduced conversion efficiencies comparing to its counterpart using dual-resonant microresonators. Through modeling, an optimal waveguide width of ~1.38 μm was predicted for fulfilling the modal-phase-matching condition, while the actual waveguide width was lithographically stepped from 1.32 to 1.46 μm (spacing of 5 nm) accounting for possible deviations during the manufacturing process.

Figure 10:
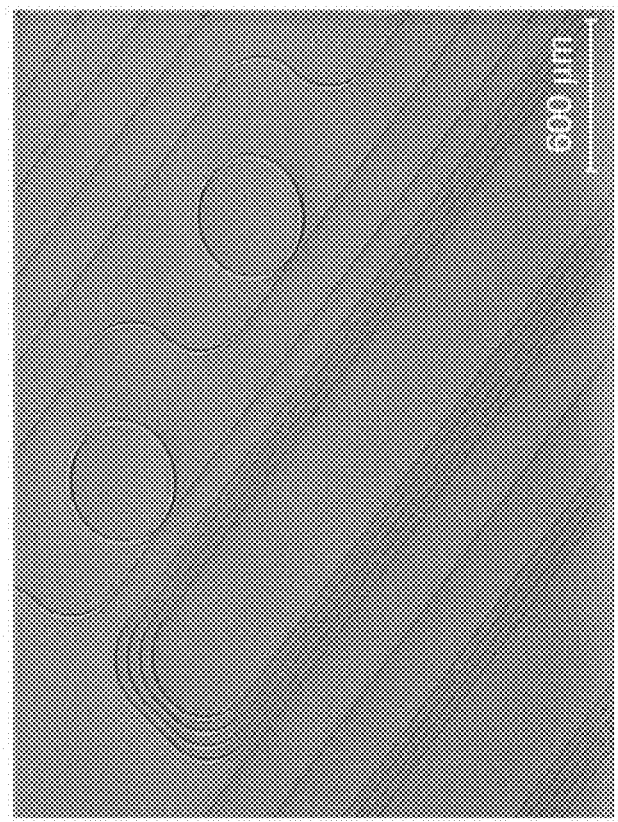
FIG. 10 shows an example experimental second-harmonic generator in accordance with some embodiments.
Figure 11:
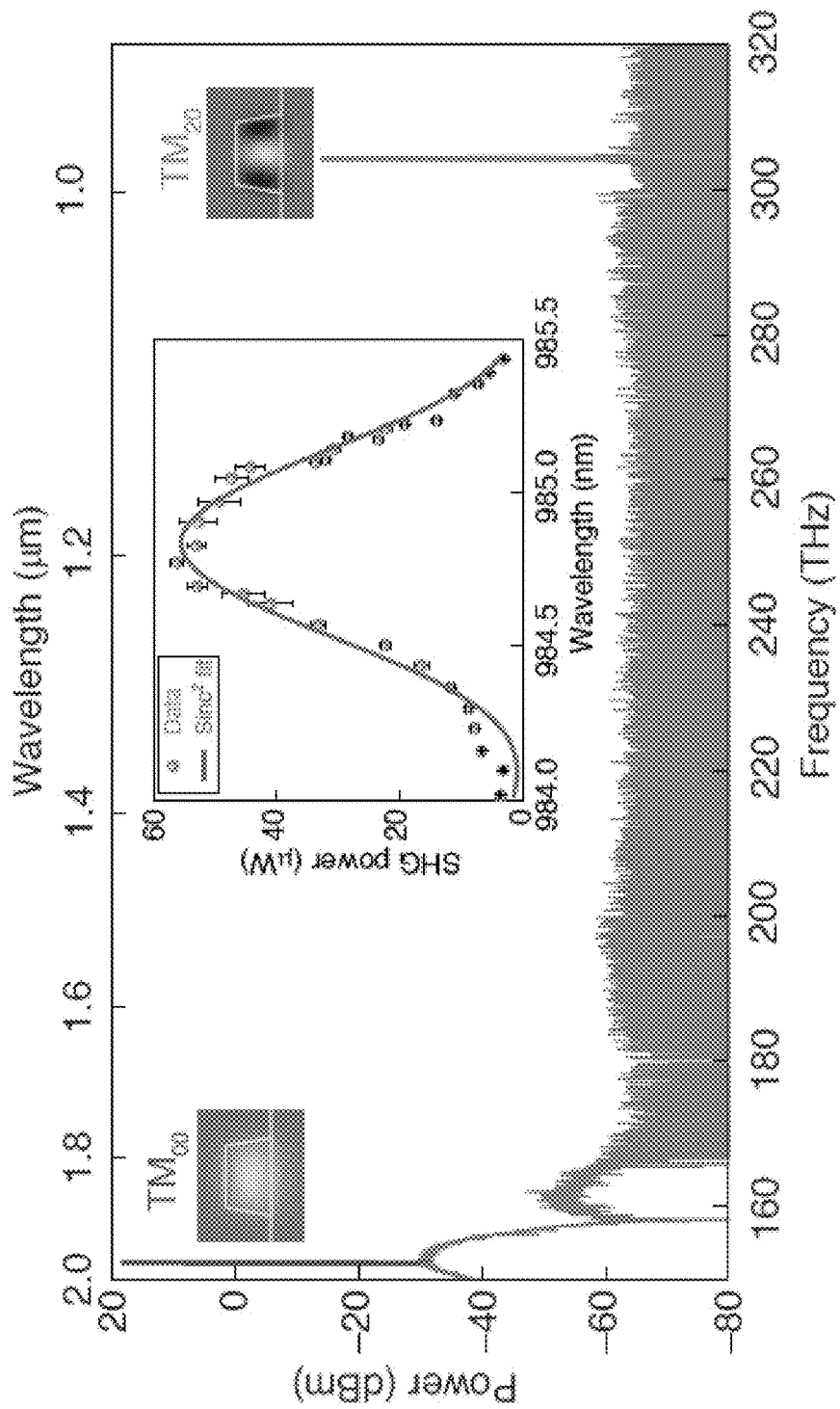
FIG. 11 shows example experimental second-harmonic generator data in accordance with some embodiments.

FIG. 10 and FIG. 11 show example experimental second-harmonic generators of device 100 and associated data. FIG. 10 is a colored scanning electron microscope images of fabricated AlN nanophotonic chips composed of octave microcomb generators (microring resonators) and SHG waveguides (total length of 6 cm, not fully shown). FIG. 11 shows SHG spectra collected from a modal phase-matched waveguide (width of 1.395 μm) at an on-chip 1f power of 355 mW, and the insets show modal profiles of the pump ($TM_{00}$) and SHG ($TM_{20}$) waves as well as the wavelength-dependent SHG power (pink dots), where a $sinc^2$-function fit (blue curve) is applied. The error bars reflect the SHG power variation from continuous three measurements.

FIG. 10 shows a section of 6 cm-long SHG waveguides co-fabricated with the microcomb generator. At a fixed fundamental wavelength (1970 nm), the phase-matching waveguide was located at the width of 1.395 μm, close to the predicted width. The corresponding SHG spectra are plotted in FIG. 11, where a high off-chip SHG power over 50 μW was achieved by boosting the fundamental pump power from a thulium-doped fiber amplifier to compensate the SHG efficiency. In the meantime, the wavelength-dependent SHG power shown in the inset indicates a large 3-dB phase-matching bandwidth of ~0.8 nm, which, together with an external heater for thermal fine-tuning, is sufficient to cover the target comb lines for subsequent heterodyne beating.

Figure 12:
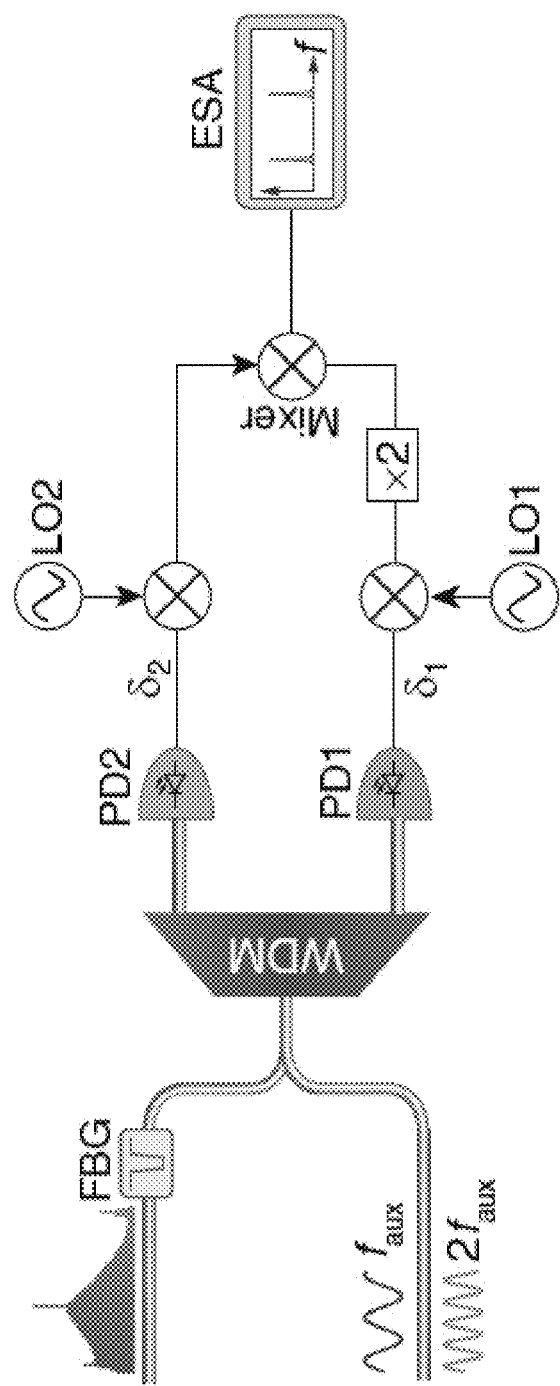
FIG. 12 shows an example experimental f–2f heterodyne measurement in accordance with some embodiments.
Figure 13:
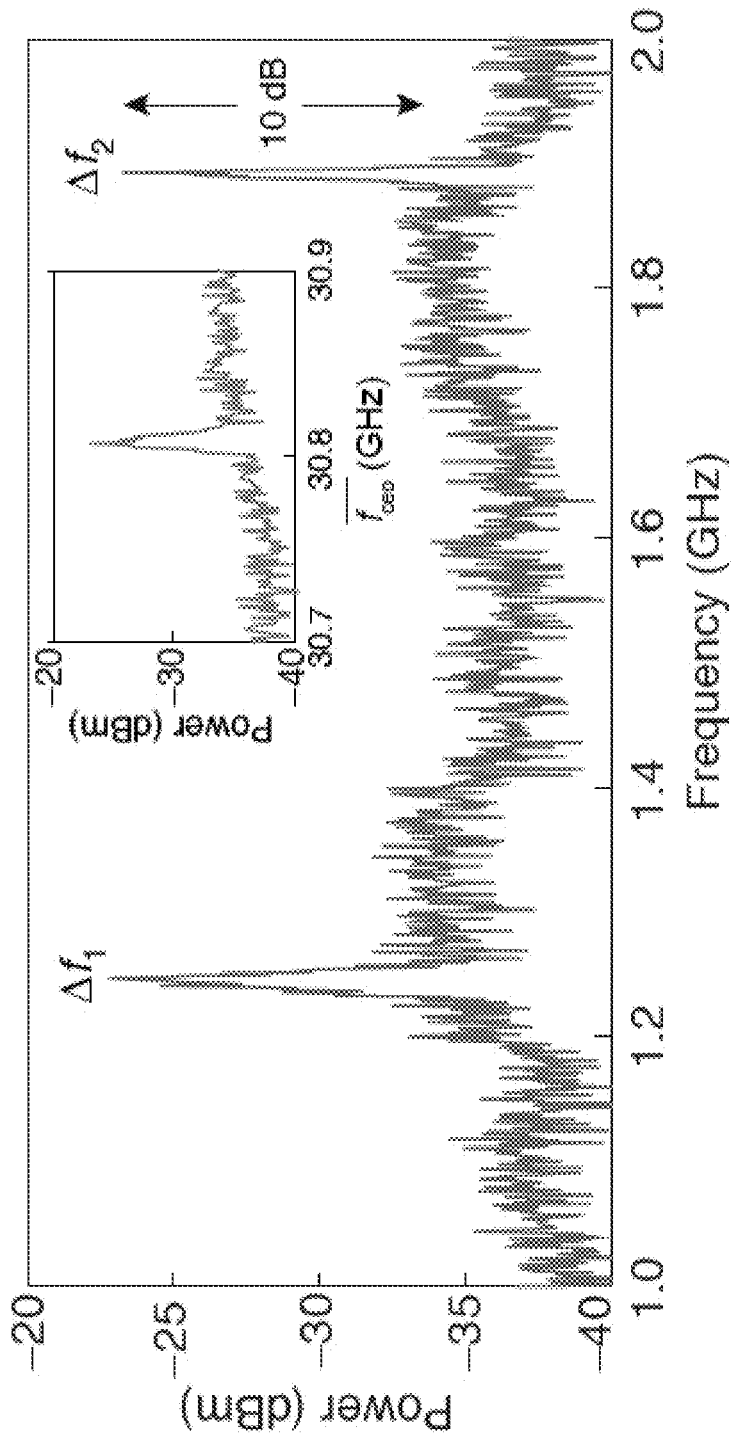
FIG. 13 shows an example experimental f–2f heterodyne measurement in accordance with some embodiments.

FIG. 12 and FIG. 13 show an example experimental f–2f heterodyne measurement. FIG. 12 is a schematic diagram for assessing the $f_{ceo}$. The symbol "×2" indicates a RF frequency doubler. FIG. 13 shows free-running f–2f beatnotes after the down-conversion process, suggesting a signal-to-noise ratio of 10 dB at a resolution bandwidth of 1 MHz. The local oscillator frequencies $f_{LO1}$ and $f_{LO2}$ are chosen to be 11.8 and 9.1 GHz, respectively, and the inset shows the equivalent curve of $\overline{fceo} = 2f_{LO1} + f_{LO2} - \Delta f_2$.

By combining outgoing light from optimal AlN soliton and SHG generators on the calibrated OSAs, the f–2f beatnote frequency was estimated to be approximately 32 GHz limited by the resolution of the OSAs. The scheme shown in FIG. 12 was employed to electronically access the $f_{ceo}$ signal in real time. The recorded soliton spectrum after suppressing pump light by a fiber Bragg grating (FBG) indicates a high off-chip power close to −40 dBm for the high-frequency DW. Meanwhile, a wavelength-division multiplexer (WMD) is utilized to separate the f and 2f frequency components before sent into the photodetectors (PDs). Two tunable radio frequency (RF) synthesizers are introduced as the local oscillators (LO1 and LO2) to down convert the photodetector signals for effective capture of f–2f beat signal at a convenient low-frequency band with an electronic spectrum analyzer (ESA, range of 20 Hz-26.5 GHz). As highlighted in FIG. 13, two down-converted beatnotes of $\Delta f_1$ and $\Delta f_2$ were recorded with a signal-to-noise ratio of 10 dB at a resolution bandwidth of 1 MHz. Much higher signal-to-noise ratios are anticipated by applying a finer detection bandwidth upon locking the telecom pump laser as well as the $f_{ceo}$ frequency. The corresponding f–2f beatnote is $\overline{fceo} = 2f_{LO1} + f_{LO2} - \Delta f_2$ (see inset of FIG. 13) since the local oscillator frequencies $f_{LO1}$ and $f_{LO2}$ are chosen to be larger than beatnotes of $\delta_1$ and $\delta_2$. The actual $f_{ceo}$ in the current device equals to $FSR - \overline{fceo}$ which is unveiled by tuning the relative positions of auxiliary laser and comb teeth frequencies, indicating the involvement of $f_n$ and $f_{2n+1}$ comb lines in the heterodyne beating. On the other hand, the $f_{LO1}$ and $f_{LO2}$ frequencies are freely adjustable up to 40 and 20 GHz in the scheme, which could further expand the accessible range of $f_{ceo}$ frequency based on the down-conversion process presented here. Meanwhile, the RF synthesizers are synchronized to a common external frequency reference, suggesting that the captured down-converted f–2f signals are available for further locking the comb teeth in a feedback loop.

Nanophotonic implementation of f–2f interferometry was demonstrated by leveraging $X^{(3)}$ octave solitons and $X^{(2)}$ SHG co-fabricated from a non-centrosymmetric AlN photonic platform. Thanks to agile GVD engineering offered by epitaxial AlN thin films, the octave soliton microcombs can reliably produce dual DWs and sub-THz repetition rates (220-433 GHz) that are accessible with unitravelling-carrier photodiodes. The overall soliton spectral span is adjustable up to 1.5 octave, on a par with state-of-the-art values (1.4 octave) reported in $Si_3N_4$ microresonators. The $f_{ceo}$ measurement was performed with the aid of an auxiliary laser for enabling SHG in phase matched AlN waveguides, thus allowing for spectral overlap with the desired octave soliton.

The spectral restriction of octave solitons for matching with the auxiliary laser wavelength can be relaxed by exploiting high-efficiency SHG in dual-resonant microresonators, which allows direct doubling of a selected comb line in the low frequency DW band. Meanwhile, the octave comb's repetition rate can be further reduced by leveraging on-chip Pockels electro-optical frequency division. By shifting the phase matching condition for SHG, octave solitons can be extended into the near-visible band, giving access to self-locked near-visible microcombs for precision metrology. Additional noncentrosymmetric photonic media can be used, such as LN, GaAs and gallium phosphide. For instance, by exploiting periodically poled LN thin films, phase matched $X^{(2)}$ and octave $X^{(3)}$ interactions can be simultaneously achieved in a single microring resonator, thus simplifying the photonic architectures.

The surface roughness and crystal quality of the AlN thin films were respectively characterized by an atomic force microscope and an X-ray diffraction scan, indicating a root-mean-square roughness of 0.2 nm in 1×1 $\mu m^2$ region and an FWHM linewidth of ~46 and 1000 arcsec along (002) and (102) crystal orientations, respectively. The film thickness was mapped by a spectroscopic ellipsometer (J. A. Woollam M-2000), providing a quick and preliminary selection of the desired AlN piece for octave soliton generation with dual DWs. In spite of varied film thicknesses across a 2-inch AlN wafer, the desired region for reproducible octave device fabrication can be reliably located.

To further reduce the propagation loss, the AlN photonic chips were annealed at 1000° C. for 2 hours. The resonator Q-factors were probed by sweeping a tunable laser (Santec TSL-710) across the cavity resonances and then fitted by a Lorentzian function. In the 100 μm-radius AlN resonators (width of 3.5 μm), a recorded $Q_{int}$ of 3.0 million was achieved, while the 50 μm-radius resonators (width of 2.3 μm) exhibit a decreased $Q_{int}$ of 1.6 million, indicating the dominant sidewall scattering loss of the current fabrication technology.

The $D_{int}$ of the AlN resonators is investigated using a finite element method (FEM) by simultaneously accounting for the material and geometric chromatic dispersion. The overall $D_{int}$ value is approximated with a fifth-order polynomial fit applied to the simulated modal angular frequencies: $\omega_\mu = \omega_0 + \mu D_1 + D_{int}$, where $D_1/(2\pi)$ is the resonator's FSR at the pump mode $\mu=0$.

The spectral dynamics of octave soliton microcombs is numerically explored based on nonlinear coupled mode equations by incorporating the Raman effect:

$$\frac{\partial}{\partial t}a_\mu = -\left(\frac{\kappa_R}{2} + i\Delta_\mu^a\right)a_\mu + ig_K \sum_{k,l,n} a_k^* a_l a_n \delta(l+n-k-\mu) - \qquad (3)$$

$$ig_R \sum_{k,l} a_l [R_k \delta(l+k-\mu) + R_k^* \delta(l-k-\mu)] + \xi_P$$

$$\frac{\partial}{\partial t}R_\mu = -\left(\frac{\gamma_R}{2} + i\Delta_\mu^R\right)R_\mu - ig_R \sum_{k,l} a_k^* a_l \delta(l-k-\mu) \qquad (4)$$

Here a and R are the mode amplitudes of cavity photons and Raman phonons with subscripts k,l,n being the mode indices, while $g_K$ and $g_R$ represent the nonlinear coupling strength of Kerr and Raman processes, respectively. The driving signal strength is $\xi_P =$ $$\sqrt{\frac{\kappa_{e,0} P_{in}}{\hbar \omega_P}}$$

at an on-chip pump power $P_{in}$, $K_\mu(K_{e,\mu})$ denotes the total (external) cavity decay rate of the $\mu^{th}$ photon mode, and $\gamma_R$ is the Raman phonon decay rate. The detuning from a $D_1$-spaced frequency grid is indicated by $\Delta_\mu^a = \omega_\mu - \omega_P - \mu D_1$ and $\Delta_\mu^R = \omega_R - \mu D_1$ with $\omega_P$ and $\omega_R$ being pump and Raman shift angular frequencies, respectively.

In the simulation, the time derivative of Raman items in Equation 4 was set to zero to speed up the computation since the decay rate of phonons is much larger than that of photons. Frequency is considered independent $k_\mu/(2\pi) \approx 120$ MHz and $k_{e,\mu}/(2\pi) \approx 75$ MHz based on measured Q-factors of 50 μm-radius AlN resonators in FIG. 8. Because incident light is TM-polarized, the involved $A^{TO}_1$ Raman phonon in AlN exhibits an $\omega_R (2\pi) \approx 18.3$ THz with an FWHM of $\gamma_R (2\pi) \approx 138$ GHz. The $g_K 2\pi$ is calculated to be 0.73 Hz for a given nonlinear refractive index $n_2 = 2.3 \times 10^{-19}$ m²/W, while an optimal $g_R 2\pi = 0.29$ MHz is adopted, resulting in a soliton spectrum matching well with the measured one in FIG. 8. The simulated high frequency DW also exhibits an evident blue shift comparing with the case of $g_R 2\pi = 0$ MHz.

Figure 14:
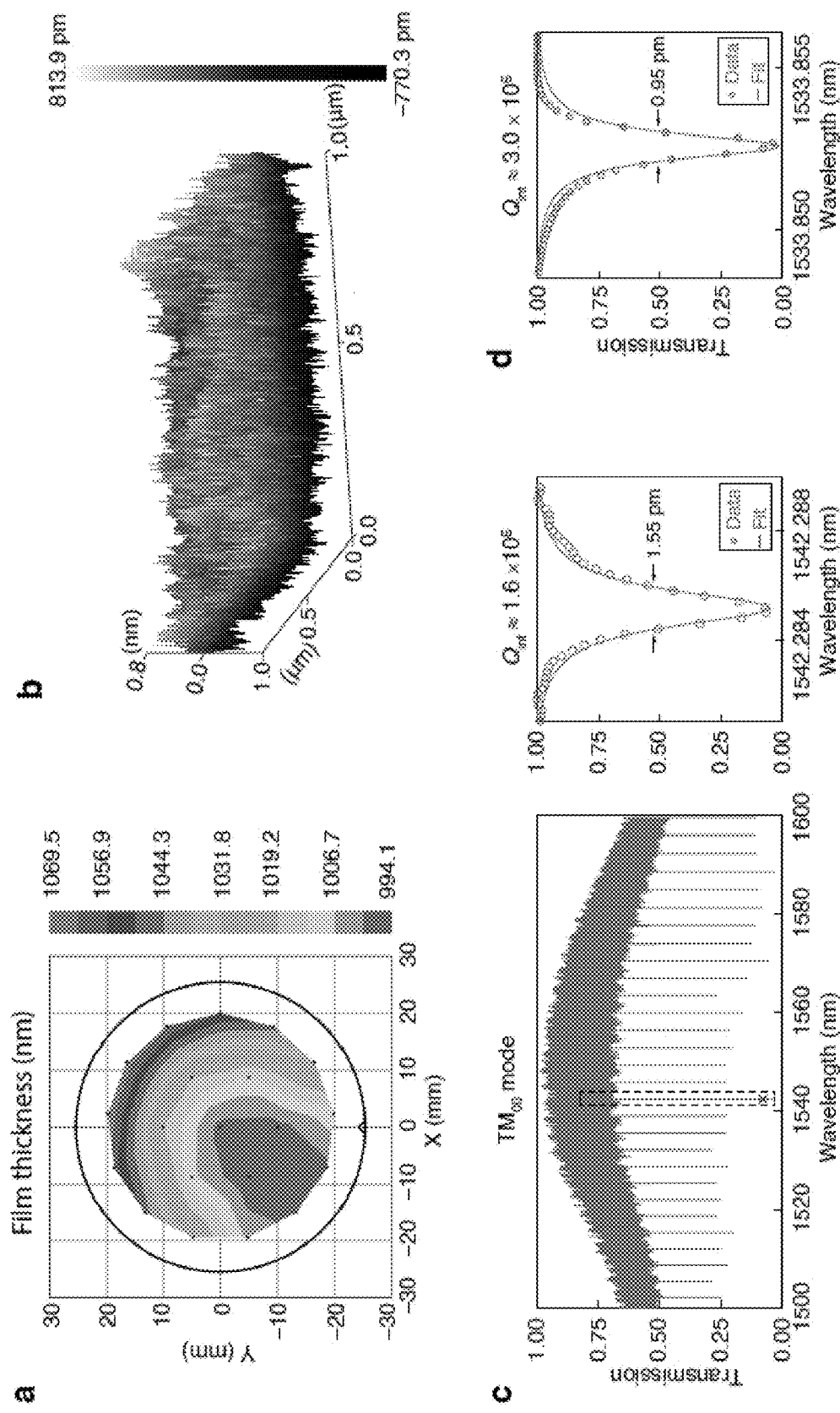
FIG. 14 shows example experimental nanophotonic device fabrication details in accordance with some embodiments.

FIG. 14 shows example experimental nanophotonic device fabrication details. FIG. 14 section A shows wafer-scale thickness mapping of a 2-inch AlN wafer using a spectroscopic ellipsometer. The right color bar indicates the corresponding thickness variation. FIG. 14 section B shows surface roughness characterization of the AlN film using an atomic force microscope. FIG. 14 section C shows transmittance of a 50 μm-radius AlN resonator (width=2.3 μm) for octave soliton generation. A zoom-in view of the resonance (indicated by dashed lines) around 1542 nm is shown in the right side, revealing a $Q_{int}$ of ~1.6 million. FIG. 14 section D shows resonance from an 100 μm-radius AlN resonator (width=3.5 μm), highlighting a reduced resonant linewidth and an improved $Q_{int}$ of ~3.0 million.

All devices are patterned from 2-inch crystalline AlN-on-sapphire wafers with 1000 nm-thick AlN epilayers. To ensure robust dispersion engineering for reproducible octave-soliton generation, the uniformity of film thickness was first characterized across the wafer. As shown in FIG. 14 section A, the film thickness of the wafer is very close to target growth thickness apart from the edge of the wafer (colored by purple). By intentionally choosing the desired thickness region, octave-soliton generation can be reliably realized using the current nanofabrication technology. For low-loss nanophotonic applications, the crystal quality of the AlN thin film is also a factor, whose root-mean-square surface roughness was characterized to be as low as 0.2 nm in a 1×1 μm² region. The result is presented in FIG. 14 section B.

An example of the resonator transmittance is shown in FIG. 14 section C, where the fundamental transverse magnetic ($TM_{00}$) mode is effectively excited while higher-order modes are suppressed by adopting a pulley waveguide coupling configuration (wrapped angle of 6°). The intrinsic quality-factors ($Q_{int}$) are then extracted from a Lorentz fit of the resonance curve at under-coupled conditions. The AlN resonators engineered for octave-soliton generation exhibits a dimension-dependent $Q_{int}$ of 1.6 million and 3.0 million for the devices with radii of 50 μm (width=2.3 μm, right of FIG. 14 section C) and 100 μm (width=3.5 μm, FIG. 14 section D), suggesting the dominant sidewall scattering loss. Further improvement of the Q-factors can be envisioned by leveraging the racetrack resonators, where the straight portions exhibit a much smoother sidewall.

Figure 15:
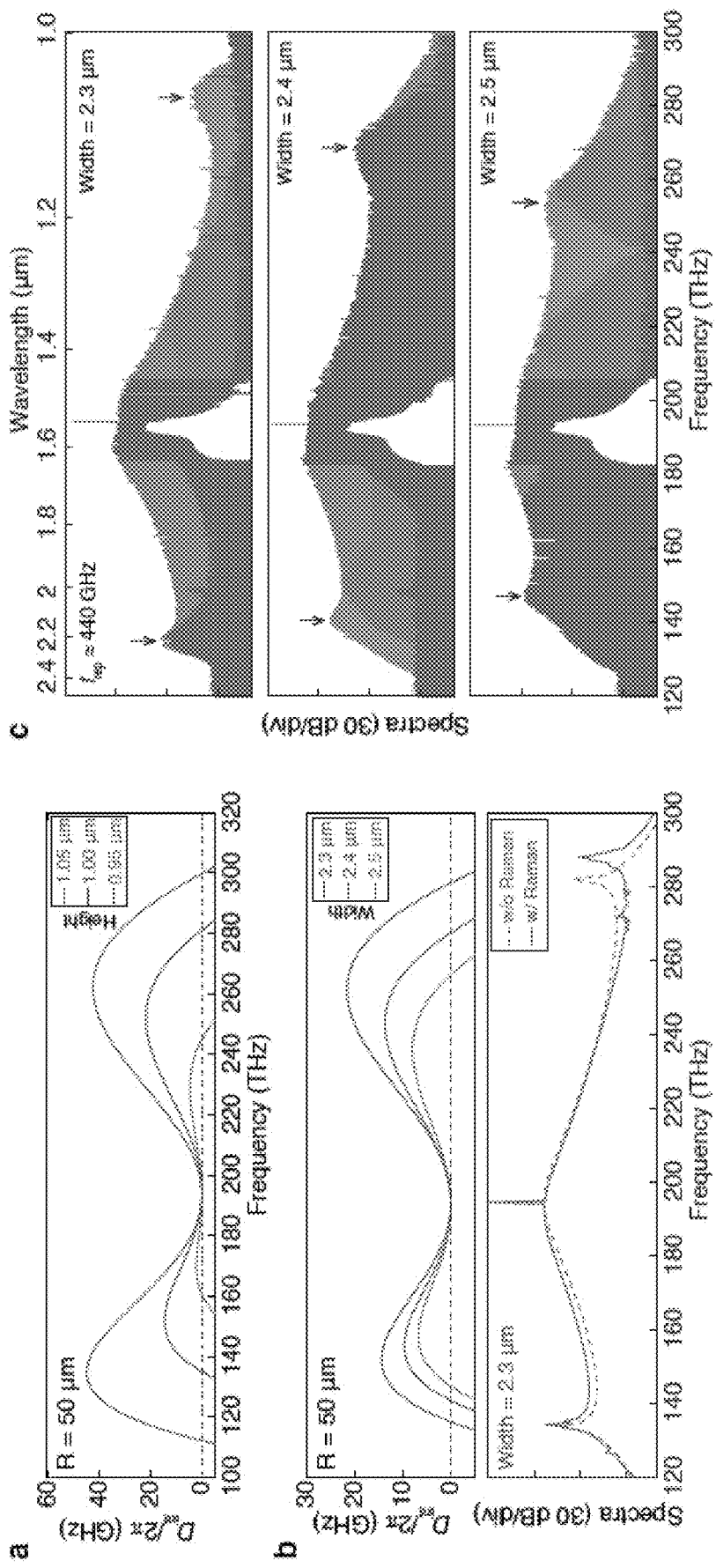
FIG. 15 shows example experimental data for dispersion engineering for octave soliton generation in accordance with some embodiments.

FIG. 15 shows example experimental data for dispersion engineering for octave soliton generation. FIG. 15 section A shows height-dependent integrated dispersion ($D_{int}$) of 50 μm-radius AlN resonators at a fixed width of 2.3 μm. The top panel of FIG. 15 section B shows width-dependent $D_{int}$ curves (radius of 50 μm, height of 1.00 μm) and the bottom panel shows numerically simulated soliton comb spectra without (orange) or with (blue) the influence of Raman effects for the $D_{int}$ curve at a resonator width of 2.3 μm (height of 1.0 μm). FIG. 15 section C shows experimentally recorded chaotic comb spectra at a varied resonator width of 2.3, 2.4 and 2.5 μm. The vertical arrows indicate the emergence of dispersive wave-like envelopes, and the corresponding $D_{int}$ curves are shown in the top panel of section B.

The AlN resonator's integrated dispersion ($D_{int}$) is highly susceptible to the film thickness variation, which affects octave soliton generation with phase-matched dual dispersive waves (DWs). As plotted in FIG. 15 section A, when the resonator height deviates from an optimal value of 1.00 μm (blue curve), such as increasing to 1.05 μm or decreasing to 0.95 μm, a larger dispersion barrier or a narrower dispersion window will occur on both sides of the $D_{int}$ curve, preventing from octave spectral extension via DW radiations. As a result, the AlN piece can be located with the desired thickness around 1000 nm (see FIG. 14) for the octave-soliton device fabrication.

At an optimal height of 1.0 μm, the $D_{int}$ curve can be further engineered by tailoring the resonator width. The result is shown in the top panel of FIG. 15 section B, where the phase-matching condition ($D_{int}=0$) for DW radiations is readily adjusted beyond one octave span when reducing the resonator width from 2.5 to 2.3 μm. The octave soliton spectrum is numerically investigated for the $D_{int}$ curve at a width of 2.3 μm. As shown in the bottom panel of FIG. 15 section B, the high-frequency DW exhibits an evident blue shift from the $D_{int}=0$ position when accounting for the Raman effect, which matches wells with the experimental result in FIG. 8. The underlying mechanism for this spectral shift is attributed to the Raman-induced soliton red shift in the spectral center, which in turn blue shifts the high-frequency DW. FIG. 15 section C plots the noise-state comb spectra recorded from the dispersion engineered AlN resonators (radius of 50 μm, width of 2.3-2.5 μm). It is found that the DW-like envelops at both ends of the spectra exhibit an evident shift when varying the resonator width, in good agreement with the $D_{int}$ curve prediction (top panel of FIG. 15 section B). In the experiment, the corresponding soliton spectrum can be captured at a resonator width of 2.3 μm (see FIG. 8), while it is inaccessible at the width of 2.4 and 2.5 μm due to the occurrence of Raman lines in the intermediate state, thus hampering soliton mode-locking.

Figure 16:
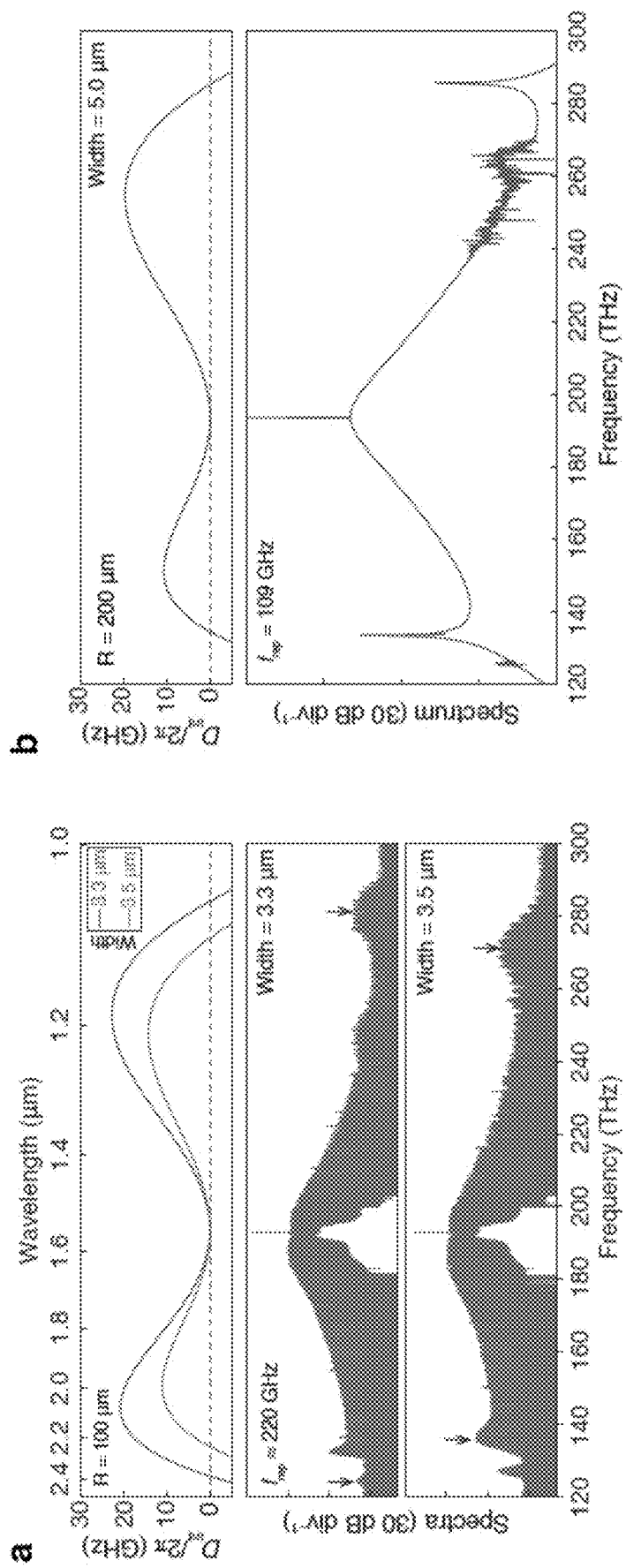
FIG. 16 shows example experimental data for dispersion engineering for repetition rate-detectable octave solitons in accordance with some embodiments.

FIG. 16 shows example experimental data for dispersion engineering for repetition rate-detectable octave solitons. The top panel of FIG. 16 section A shows $D_{int}$ curves of engineered AlN resonators at a radius of 100 μm and varied widths of 3.3 and 3.5 μm, and the bottom panel shows captured noise-state comb spectra with a reduced repetition rate of ~220 GHz. The vertical arrows indicate the emergence of DW-like peaks. The top panel of FIG. 16 section B shows $D_{int}$ curve of AlN resonators at an increasing radius of 200 μm and an optimal width of 50 μm, and the bottom panel shows simulated soliton spectrum at an on-chip pump power of 100 mW, highlighting a reduced repetition rate of 109 GHz.

By further engineering the resonator dimensions, octave solitons are achieved with repetition rates reduced by two times. As shown in the top panel of FIG. 16 section A, at an elevated resonator radius of 100 μm, the phase-matching conditions for separated dual DWs by one optical octave are accessible from engineered $D_{int}$ curves at optimal resonator widths of 3.3 and 3.5 μm. This prediction is verified by the recorded comb spectra with repetition rates ($f_{rep}$) of ~220 GHz (see bottom panel of FIG. 16 section A), where dual DW-like envelopes indicated by vertical arrows match well with the $D_{int}$=0 condition in each case. The abnormal spectral peaks observed in the low-frequency region might arise from the avoided mode-crossing due to imperfections in the device fabrication, which is not included in the dispersion modeling. The soliton comb spectrum was captured at a resonator width of 3.5 μm (see FIG. 8), while the occurrence of intermediate Raman lines prevents from soliton mode-locking for the case of a resonator width=3.3 μm.

The agile dispersion engineering in the material system also offers the capability to achieve octave solitons with electronically detectable repetition rates by commercial high-speed photodetectors (bandwidth>100 GHz). As shown in FIG. 16 section B, upon increasing the resonator radius to 200 μm, it is possible to achieve a low free spectrum range (FSR) of 109 GHz and an optimal $D_{int}$ curve (top panel) for octave soliton generation at a resonator width of 5.0 μm. The corresponding soliton spectrum was numerically investigated and presented in the bottom panel. A $Q_{int}$ of 10 million was chosen at critical coupled conditions for enabling octave soliton generation at a low on-chip pump power of 100 mW. Since the resonator's FSR is already smaller than the $A^{TO}_1$ phonon linewidth (~138 GHz) of crystal AlN films, the Raman effect must be suppressed for soliton mode-locking. For the numerical investigation shown here, the influence of Raman effects is disregarded, while it should be considered in practical devices.

Figure 17:
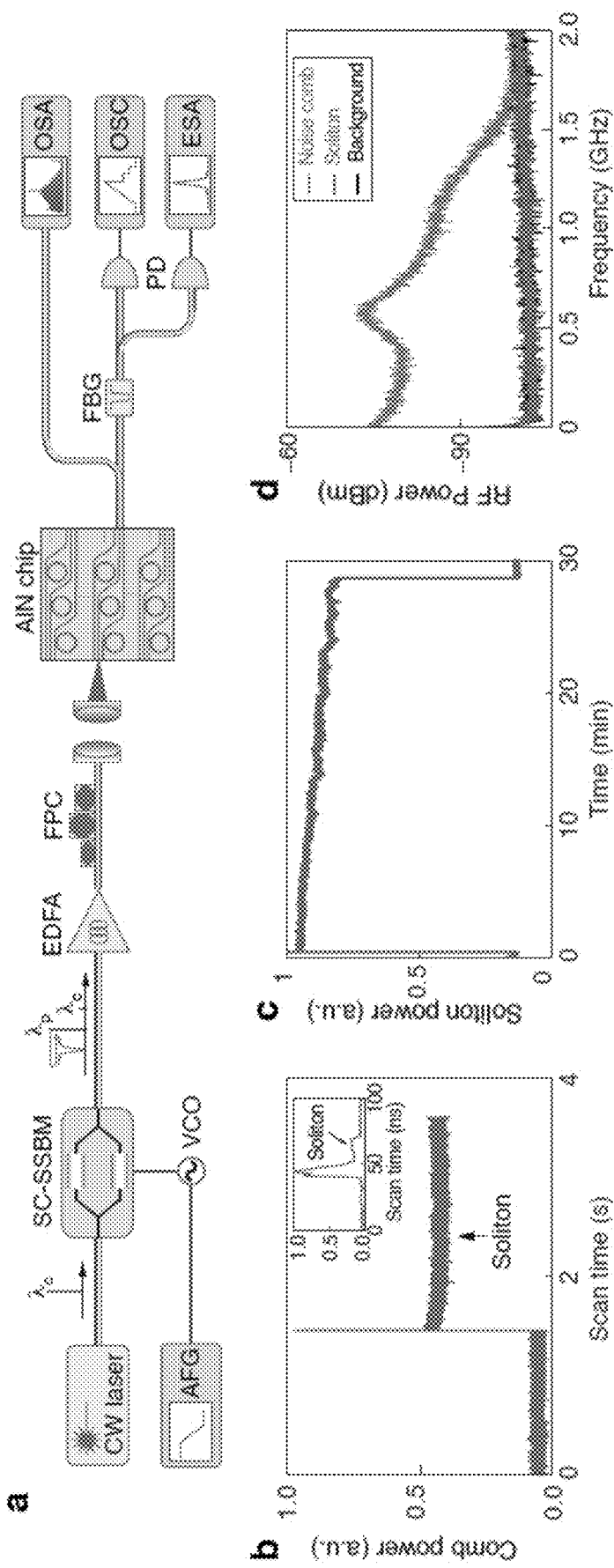
FIG. 17 shows an example experimental setup and data for octave-soliton characterization in accordance with some embodiments.

FIG. 17 shows an example experimental setup and data for octave-soliton characterization. FIG. 17 section A shows a sketch of the experimental configuration. The SC-SSBM produces a blue-shifted sideband ($\lambda_p$) relative to incident light ($\lambda_c$) from a continuous-wave (CW) laser. The sideband is then boosted by an erbium-doped fiber amplifier (EDFA) and aligned to the vertical polarization before entering the AlN chip via an aspherical lens pair. FIG. 17 section B shows comb power trace recorded in the OSC, indicating elongated soliton duration time beyond 2 s, and the inset shows initial soliton lifetime of ~20 ns. FIG. 17 section C shows free-running soliton power trace as a function of the time. FIG. 17 section D shows radio-frequency (RF) beating properties of chaotic (red) and soliton microcombs (blue) comparing with the PD background (black).

The experimental setup for the octave soliton generation is sketched in FIG. 17 section A. The transition from chaotic to soliton states typically accompanies a notable intracavity power drop, which in turn renders thermo cooling of the resonator with blue-shifted resonances, hindering stable soliton formation. This obstacle was addressed by using rapid frequency scan schemes based on a suppressed-carrier single sideband modulator (SC-SSBM). The SC-SSBM is driven by a voltage controller oscillator (VCO) connected to an arbitrary function generator (AFG), allowing rapid frequency shifting (up to 500 MHz/ns) across the resonance at a timescale far beyond the thermal-optic response (microseconds).

For characterization, light existing the chip is collected by a bare fiber (mode diameter of 4 μm) before sent into two grating-based optical spectrum analyzers (OSAs, the other one is not shown) and two photodetectors (PDs) following by an oscilloscope (OSC) and an electronic spectrum analyzer (ESA). A fiber-Bragg grating is also employed to suppress strong pump light. FIG. 17 section B plots a typical comb power trace when entering the soliton state. Despite the initial soliton lifetime of ~20 ns, it can be elongated beyond 2 s using the rapid frequency scan scheme. The corresponding octave-soliton spectrum is shown in FIG. 8. Upon entering the soliton state, the octave comb maintains a high stability during the full experiment span until the fiber-to-chip coupling becomes misaligned as indicated in in FIG. 17 section C. The coherence of the spectrum was also evaluated by sending a portion of comb lines (after suppressing pump light) into a PD. As shown in FIG. 17 section D, there is no evidence of low-frequency radio-frequency (RF) noise within a span of 2 GHz for the octave soliton comparing with the chaotic state, suggesting a high degree of coherence.

Figure 18:
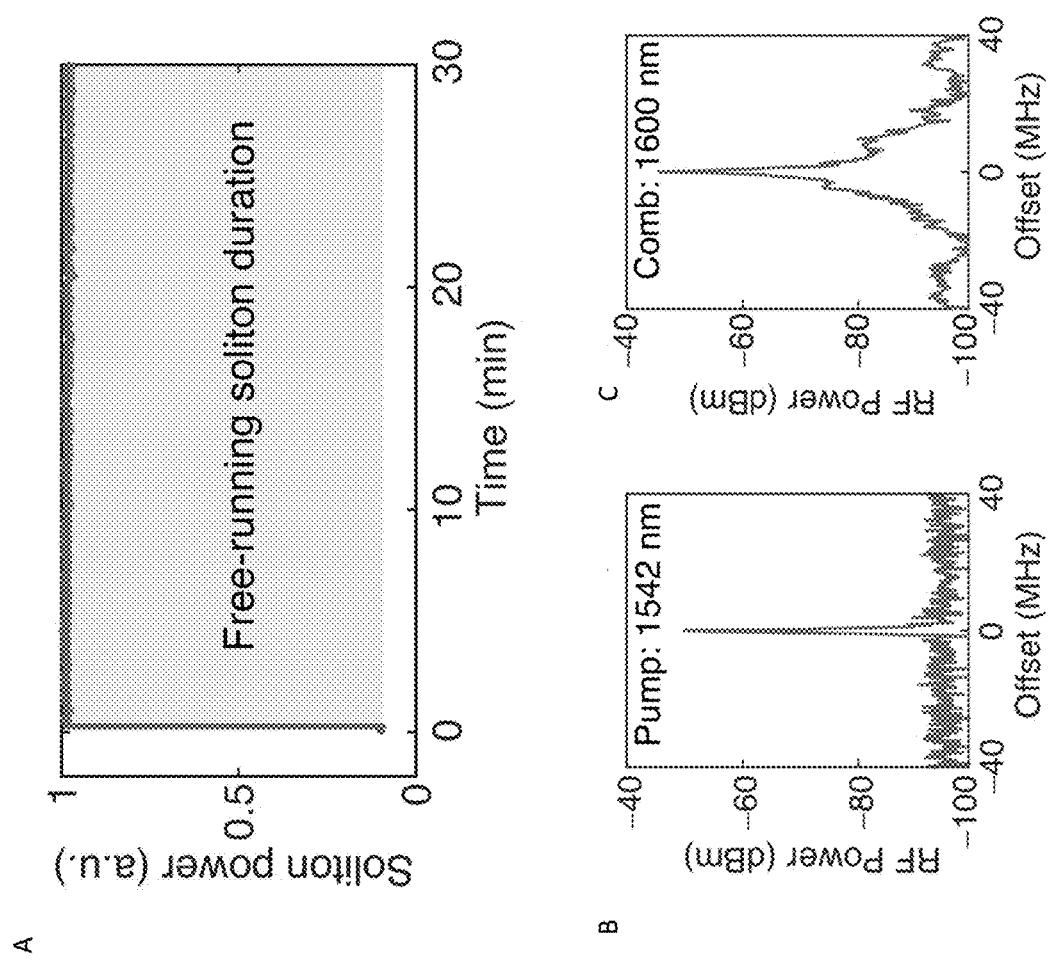
FIG. 18 shows example experimental data for characterization of the device in accordance with some embodiments.

FIG. 18 shows example experimental data for characterization of the device 100. FIG. 18 section A is a plot showing the stability of the free-running soliton duration. FIG. 18 section B and section C are plots showing the RF power of a pump and comb, respectively, for heterodyne beatnotes (RBW: 100 kHz).

FIG. 19 shows example experimental data on SHG conversion efficiency. FIG. 19 section A shows on-chip SHG power versus the pump power as well as the applied second-order polynomial fit (orange solid line), and the inset shows calculated effective indices ($n_{eff}$) of $TM_{00}$ (wavelength of 1970 nm) and second-order $TM_{20}$ (wavelength of 985 nm) modes versus the waveguide width. FIG. 19 section B shows calculated SHG efficiency (indicated by right color bar) as a function of the $TM_{20}$ mode propagation loss and the waveguide length. The "red star" symbol corresponds to the experimentally estimated SHG efficiency.

To access the carrier-envelop offset frequency ($f_{ceo}$) of octave soliton combs, a set of AlN waveguides were co-fabricated for efficient second-harmonic generation (SHG) as described in FIG. 10. The modal-phase-matching case for the pump ($TM_{00}$) and SHG ($TM_{20}$) modes were considered, for which an optimal waveguide width can be obtained around 1.38 μm to fulfill the phase-matching condition (see inset of FIG. 19 section A). By lithographically scanning the waveguide width at a spacing of 5 nm, the phase-matching waveguide for producing SHG spectra is located as shown in FIG. 11. The insertion loss of the $TM_{00}$ mode at 1970 nm was measured to be ~7 dB/facet, while the insertion loss of the $TM_{20}$ mode at 985 nm is estimated to be around 15 dB/facet because of the small modal overlap between the high-order $TM_{20}$ mode with the fiber mode. The calibrated on-chip SHG power ($P_{SHG}$) versus the pump power ($P_p$) is plotted in FIG. 19 section A, where an on-chip SHG conversion efficiency $\eta_{SHG}=P_{SHG}/P_p^2$ is derived to be 0.012 $W^{-1}$.

The SHG efficiency with the coupled wave equation was analytically investigated at a slowly varying amplitude approximation. Since the SHG mode ($TM_{20}$) is more susceptible to the waveguide sidewall roughness, its propagation loss (a) is also included into the model shown below:

$$\frac{db}{dz} = -\frac{\alpha}{2}b + \frac{i\omega_b^2 \chi^{(2)} \Gamma}{4k_b c^2} a^2 \exp(i\Delta kz) \quad (5)$$

Here a and b are the slowly varying field amplitude of $TM_{00}$ and $TM_{20}$ waves along the waveguide direction z, while $k_q=n_b\omega_q/c$ is the propagation constant with n, ω, and c being the effective index, angular frequency, and light speed in vacuum, respectively. The subscript q denotes the parameters of the mode a or b. Meanwhile, $X^{(2)}$ is the quadratic optical nonlinearity, Δk equals to $2k_a-k_b$, and Γ describes the modal overlap of a and b modes given by:

$$\Gamma = \frac{\int u_a^2 u_b^* dx dy}{\left(\int |u_a|^2 dx dy\right)\left(\int |u_b|^2 dx dy\right)^{1/2}} \quad (6)$$

where $u_a$ and $u_b$ indicate the transverse field distribution.

By solving Equation 5 for deriving the SHG power $$P_{SHG} = \frac{n_b \varepsilon_0 c |b|^2}{2} \int |u_b|^2 dx dy$$

the on-chip SHG efficiency reads:

$$\eta_{SHG} = \frac{(\omega_a \chi^{(2)} \Gamma L)^2}{2n_a^2 n_b \varepsilon_0 c^3} \frac{\sinh^2(\alpha L/4) + \sin^2(\Delta k L/2)}{(\alpha L/4)^2 + (\Delta k L/2)^2} \quad (7)$$

Here $\varepsilon_0$ is the permittivity in vacuum and L is the overall waveguide length. Based on Equation 7, ηSHG was calculated at phase-matching condition (i.e., Δk=0) as shown in FIG. 19 section B. It is evident that the mode propagation loss makes a significant impact on the SHG efficiency in such a long waveguide. In the experiment, a waveguide length of 6 cm was adopted and the calculated ηSHG is found to agree with the experimental value when the $TM_{20}$ loss is around 6 dB/cm. The result is in reasonable agreement with the experimentally extracted $TM_{20}$ loss (~2 dB/cm at 780 nm) when accounting for possible deviation from perfect phase-matching conditions in practical devices.

Figure 20:
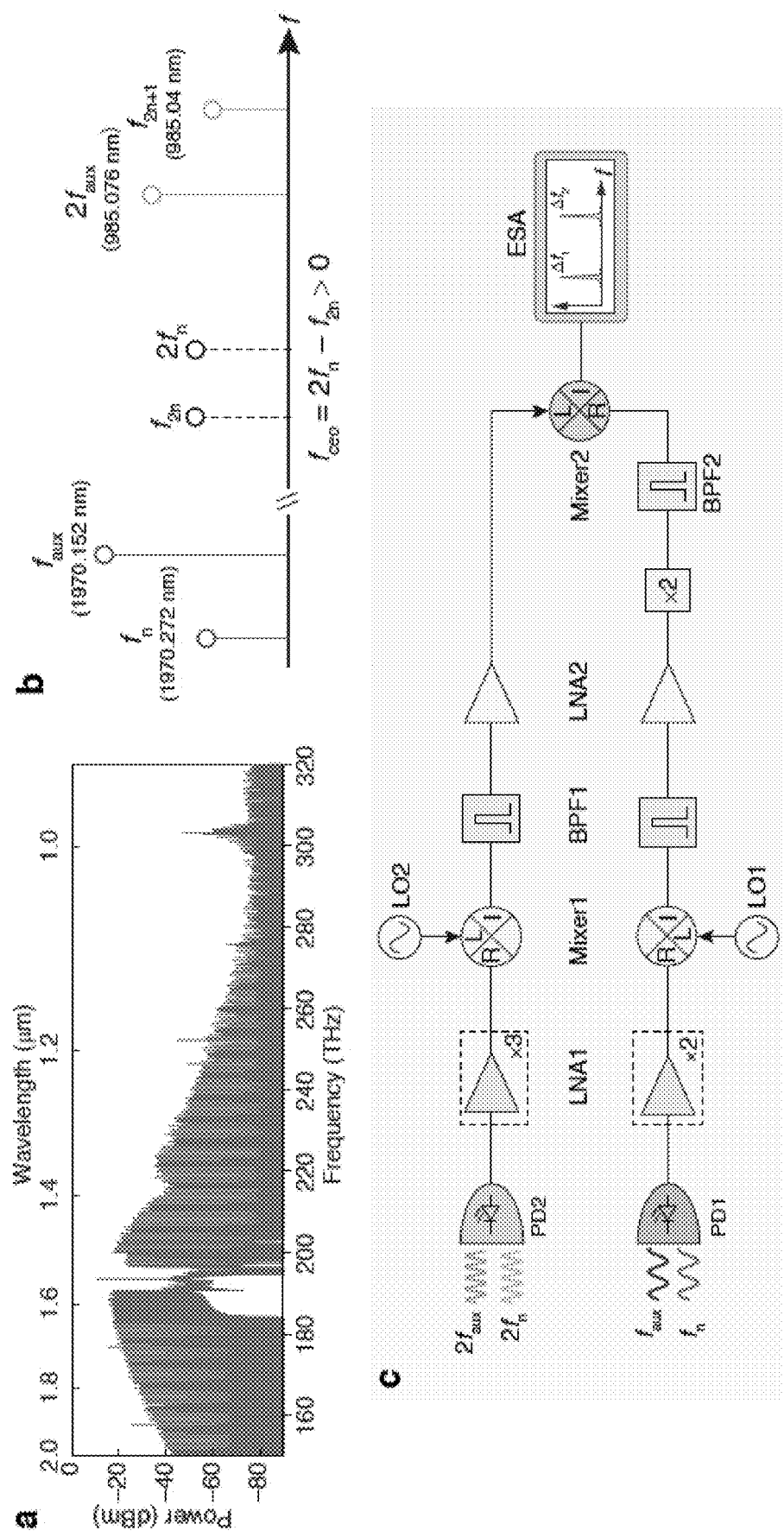
FIG. 20 shows example experimental data for implementation of f–2f interferometry in accordance with some embodiments.

FIG. 20 shows example experimental data for implementation of f–2f interferometry. FIG. 20 section A shows the octave soliton spectrum after suppressing the pump by a FBG (see full spectrum in FIG. 11). FIG. 20 section B shows a sketch of the involved frequencies (monitored by the OSAs) around the f and 2f bands for the $f_{ceo}$ measurement. FIG. 20 section C shows an illustration of the experimental setup for electronically accessing the $f_{ceo}$ based on a down-conversion frequency process. PD1: 830-2150 nm, 0-12.5 GHz; PD2: 800-1700 nm, 0-26 GHz; LNA1: 6-18 GHz, gain≈27 dB; LNA2: 10-800 MHz, gain≈60 dB; Mixer1: L/R port (7.5-20 GHz), I port (0-7.5 GHz); BPF1: 20-1000 MHz; RF doubler: 10-1000 MHz; BPF2: 1.5-2 GHz; Mixer2: L/R port (1-2700 MHz), I port (1-2000 MHz).

Based on the optimized octave soliton comb and SHG generator, a f–2f interferometer was established for accessing the $f_{ceo}$ frequency. To enable efficient optical-to-electrical conversion in the PDs, the residual pump light is suppressed by a broadband FBG and the recorded octave comb spectrum is presented in FIG. 20 section A. By adjusting the auxiliary laser frequency ($f_{aux}$) to overlap with one of the comb line, a strong $2f_{aux}$ tone was produced in the proximity of $f_{2n}$ comb line. In the case shown, $2f_{aux}$ is closer to the $f_{2n+1}$ comb line, which is then selected for implementing the f–2f interferometry. These optical frequencies are monitored by two OSAs (350-1750 nm and 1500-3400 nm) at a resolution of 0.05 and 0.1 nm, respectively. The positions of relevant laser lines are sketched in FIG. 20 section B, where a positive $f_{ceo}$ frequency is ensured at the assigned comb line indices. By setting $\delta_1=f_{aux}-f_n$ and $\delta=f_{2n+1}-2f_{aux}$, it follows that $f_{ceo}=2f_n-f_{2n}=FSR-(\delta_2+2\delta_1)$.

In order to expand the electronic accessing range of the $f_{ceo}$ beatnote, a down-conversion process was leveraged as sketched in FIG. 20 section C, where the incident lights in the f and 2f paths respectively beat at high-speed photodetectors (PD1 and PD2), and the generated beatnotes are boosted by cascaded low-noise amplifiers (LNA1) before sent into the RF Mixers (Mixer1) for producing down-converted frequency signals below 1 GHz. After bandpass filtering (BPF1, 20-1000 MHz), the down-converted beatnotes are boosted by high-gain LNA2s for driving a RF doubler and a Mixer2 in the f and 2f paths, respectively. The frequency-doubled signal is selected by another bandpass filter (BPF2) and the mixing frequency signals in the Mixer2 are monitored by an ESA (20 Hz-26.5 GHz).

The Mixers are driven by two tuned local oscillators (LO1 and LO2) covering a frequency span of 0-40 GHz ($f_{LO1}$) and 0-20 GHz ($f_{LO2}$), respectively. In the experiment, $f_{LO1}$ and $f_{LO2}$ were chosen to be larger than $\delta_1$ and $\delta_2$. As a result, the output frequencies from the Mixer2 read:

$$\Delta f_1 = 2f_{LO1} - f_{LO2} - (2\delta_1 - \delta_2) \quad (8)$$

$$\Delta f_2 = 2f_{LO1} + f_{LO2} - (2\delta_1 + \delta_2) \quad (9)$$

It is notable that this scheme allows for an accessible f–2f beatnote (that is $2\delta_1+\delta_2$) up to $2f_{LO1}+f_{LO2}$, which is 100 GHz in the apparatus.

Figure 21:
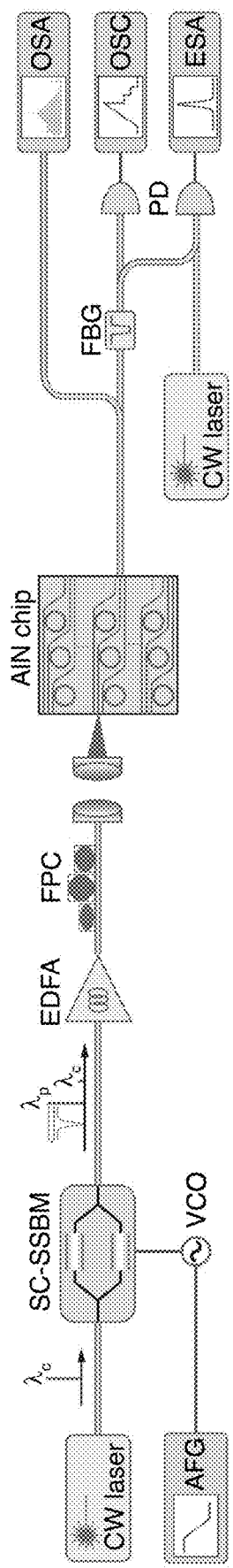
FIG. 21 shows a sketch of an additional example experimental setup similar to the example experimental setup shown in FIG. 17 in accordance with some embodiments.

FIG. 21 shows a sketch of an additional example experimental setup similar to the example experimental setup shown in FIG. 17 section A. The SC-SSBM produces a blue-shifted sideband (λp) relative to incident light (λc) from a continuous-wave (CW) laser. The sideband is then boosted by an erbium-doped fiber amplifier (EDFA) and aligned to the vertical polarization before entering the AlN chip via an aspherical lens pair. In this experimental setup, a second CW laser is added for use in the production of the ESA output.

Figure 22:
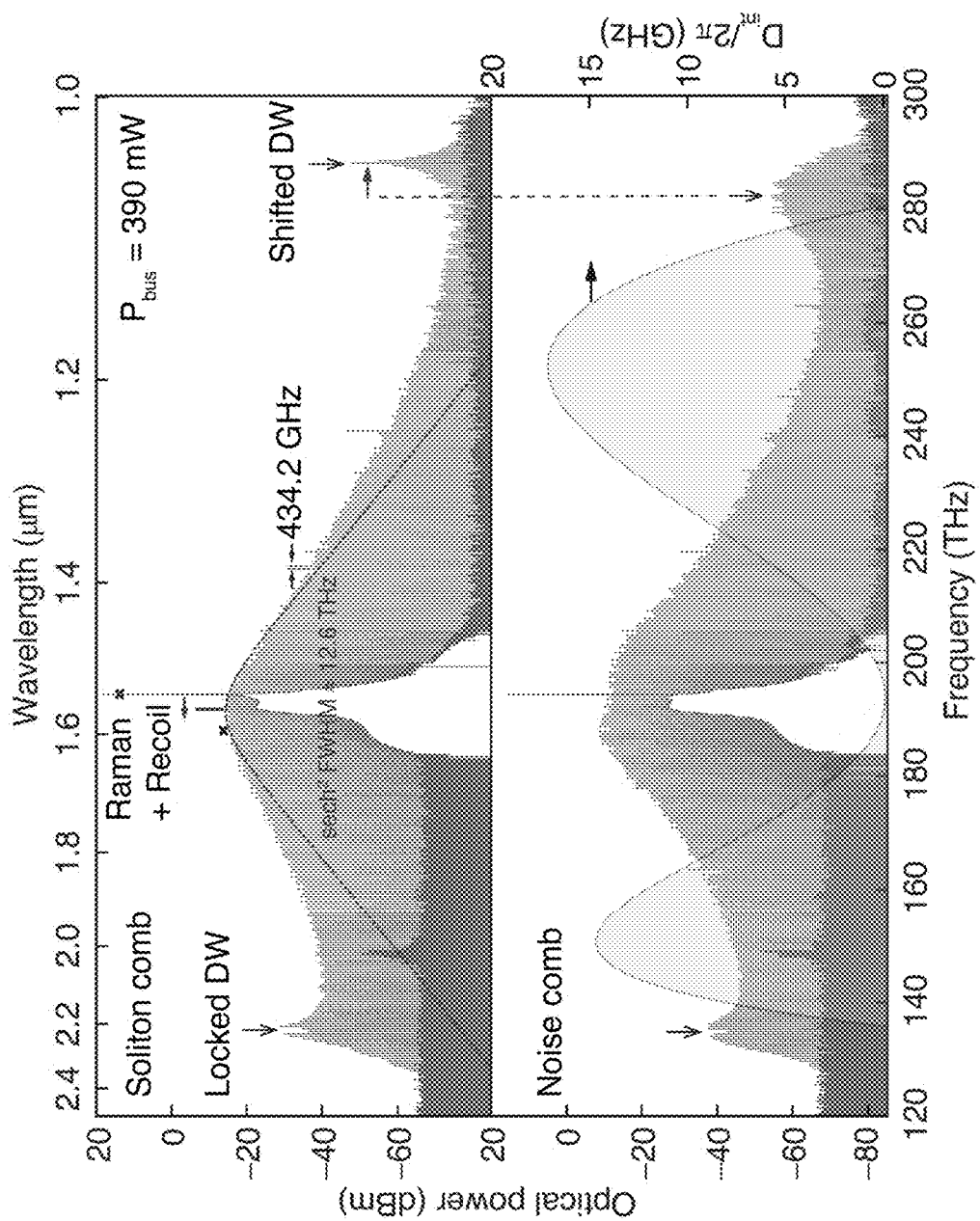
FIG. 22 shows a plot of example experimental data in accordance with some embodiments.

FIG. 22 shows a plot of example experimental data. The top panel of FIG. 22 shows data for a soliton comb, and the bottom panel shows data for a noise comb. As shown, the soliton comb has a 1.3 octave span, with 1.1 octave between dispersive peaks.

Figure 23:
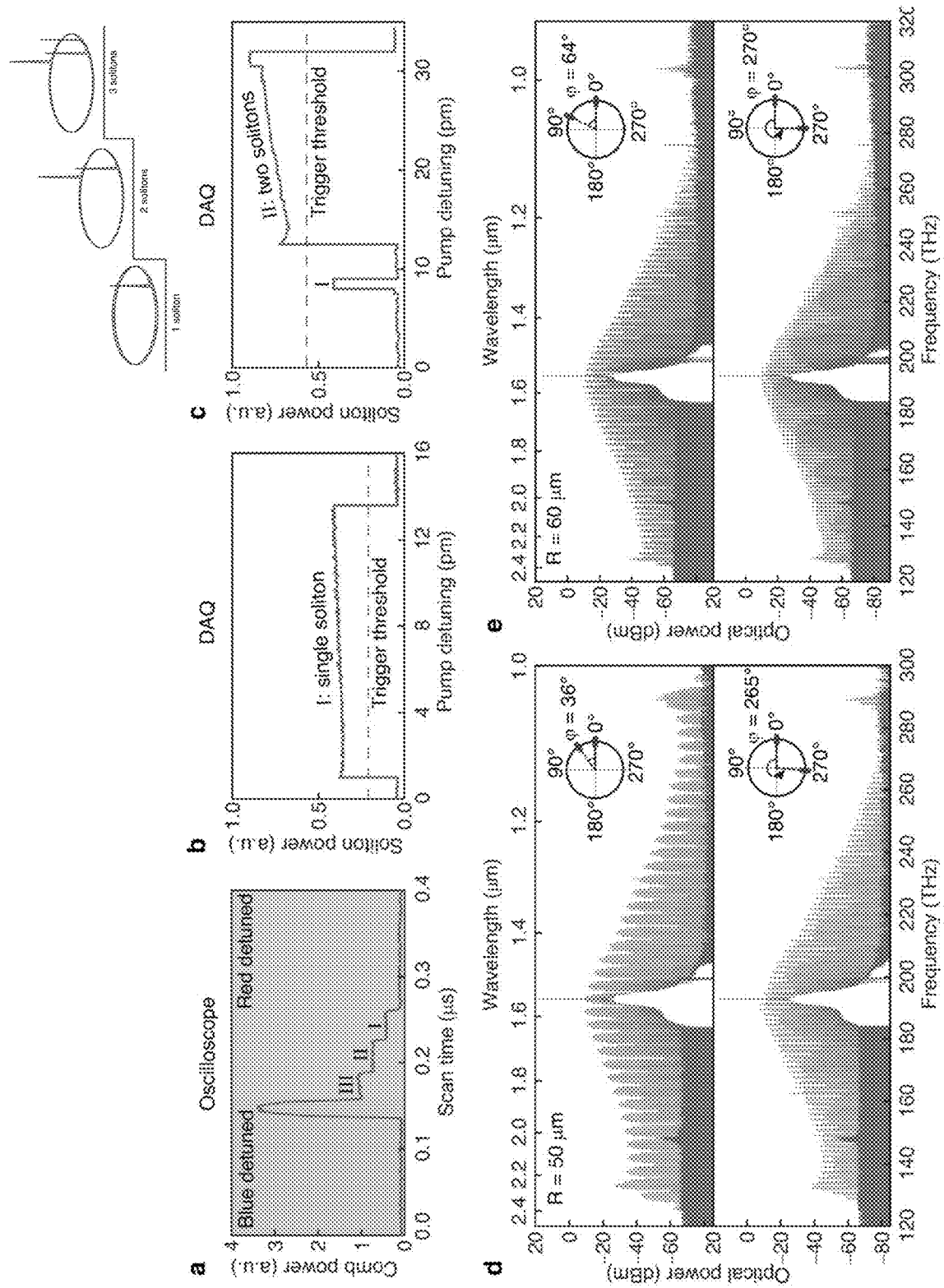
FIG. 23 shows example experimental data for example comb structures in accordance with some embodiments.

FIG. 23 shows example experimental data for example comb structures. FIG. 23 section A is a plot showing comb power versus scan time showing three solitons (I, II, III) and blue and red detuned regions. FIG. 23 section B is a plot showing soliton power versus pump detuning for a single soliton (I) and a trigger threshold. FIG. 23 section C is a plot showing soliton power versus pump detuning for two solitons (I, II)) and a trigger threshold. FIG. 23 section D is a plot showing optical power versus frequency at phase angles of 360 and 2650 for R equal to 50 μm. FIG. 23 section E is a plot showing optical power versus frequency at phase angles of 640 and 270° for R equal to 60 μm.

FIG. 24 is a chart comparing properties of AlN to SiN for use in device 100. As shown in the figure, AlN provides for second-harmonic doubling, electro-optic modulation, a larger spectral span, multiple repetition rates, and easily reproducible results.

Further details can be found in "III-Nitride nanophotonics for beyond-octave soliton generation and self-referencing" by X. Liu et al., incorporated herein by reference in its entirety.

The following references are also included herein by reference in their entirety:

[1] T. Fortier and E. Baumann, "20 years of developments in optical frequency comb technology and applications," Commun. Phys. 2, 153 (2019).
[2] D. Waldburger, A. S. Mayer, C. G. E. Alfieri, J. Nürnberg, A. R. Johnson, X. Ji, A. Klenner, Y. Okawachi, M. Lipson, A. L. Gaeta, and U. Keller, "Tightly locked optical frequency comb from a semiconductor disk laser," Opt. Express 27, 1786 (2019).
[3] M. Zhang, B. Buscaino, C. Wang, A. Shams-Ansari, C. Reimer, R. Zhu, J. M. Kahn, and M. Lončar, "Broadband electro-optic frequency comb generation in a lithium niobate microring resonator," Nature 568, 373 (2019).
[4] A. L. Gaeta, M. Lipson, and T. J. Kippenberg, "Photonic-chip-based frequency combs," Nat. Photon. 13, 158 (2019).
[5] A. Pasquazi, M. Peccianti, L. Razzari, D. J. Moss, S. Coen, M. Erkintalo, Y. K. Chembo, T. Hansson, S. Wabnitz, P. Del'Haye, X. Xue, A. M. Weiner, and R. Morandotti, "Micro-combs: A novel generation of optical sources," Phys. Rep. 729, 1 (2018).
[6] T. J. Kippenberg, A. L. Gaeta, M. Lipson, and M. L. Gorodetsky, "Dissipative kerr solitons in optical microresonators," Science 361, eaan8083 (2018).
[7] B. Stern, X. Ji, Y. Okawachi, A. L. Gaeta, and M. Lipson, "Battery-operated integrated frequency comb generator," Nature 562, 401 (2018).
[8] A. S. Raja, A. S. Voloshin, H. Guo, S. E. Agafonova, J. Liu, A. S. Gorodnitskiy, M. Karpov, N. G. Pavlov, E. Lucas, R. R. Galiev, A. E. Shitikov, J. D. Jost, M. L. Gorodetsky, and T. J. Kippenberg, "Electrically pumped photonic integrated soliton microcomb," Nat. Commun. 10, 680 (2019).
[9] T. Herr, V. Brasch, J. D. Jost, C. Y. Wang, N. M. Kondratiev, M. L. Gorodetsky, and T. J. Kippenberg, "Temporal solitons in optical microresonators," Nat. Photon. 8, 145 (2014).
[10] X. Xue, Y. Xuan, Y. Liu, P.-H. Wang, S. Chen, J. Wang, D. E. Leaird, M. Qi, and A. M. Weiner, "Mode-locked dark pulse kerr combs in normal-dispersion microresonators," Nat. Photon. 9, 594 (2015).
[11] V. Brasch, M. Geiselmann, T. Herr, G. Lihachev, M. H. P. Pfeiffer, M. L. Gorodetsky, and T. J. Kippenberg, "Photonic chip-based optical frequency comb using soliton cherenkov radiation," Science 351, 357 (2015).
[12] X. Yi, Q.-F. Yang, K. Y. Yang, M.-G. Suh, and K. Vahala, "Soliton frequency comb at microwave rates in a high-q silica microresonator," Optica 2, 1078 (2015).
[13] C. Joshi, J. K. Jang, K. Luke, X. Ji, S. A. Miller, A. Klenner, Y. Okawachi, M. Lipson, and A. L. Gaeta, "Thermally controlled comb generation and soliton modelocking in microresonators," Opt. Lett. 41, 2565 (2016).
[14] M. Yu, Y. Okawachi, A. G. Griffith, M. Lipson, and A. L. Gaeta, "Mode-locked mid-infrared frequency combs in a silicon microresonator," Optica 3, 854 (2016).
[15] Z. Gong, A. Bruch, M. Shen, X. Guo, H. Jung, L. Fan, X. Liu, L. Zhang, J. Wang, J. Li, J. Yan, and H. X. Tang, "High-fidelity cavity soliton generation in crystalline AlN micro-ring resonators," Opt. Lett. 43, 4366 (2018).
[16] Y. He, Q.-F. Yang, J. Ling, R. Luo, H. Liang, M. Li, B. Shen, H. Wang, K. Vahala, and Q. Lin, "Self-starting bi-chromatic linbo3 soliton microcomb," Optica 6, 1138 (2019).
[17] Z. Gong, X. Liu, Y. Xu, M. Xu, J. B. Surya, J. Lu, A. Bruch, C. Zou, and H. X. Tang, "Soliton microcomb generation at 2 μm in z-cut lithium niobate microring resonators," Opt. Lett. 44, 3182 (2019).
[18] Q.-F. Yang, X. Yi, K. Y. Yang, and K. Vahala, "Stokes solitons in optical microcavities," Nat. Phys. 13, 53 (2016).
[19] H. Guo, M. Karpov, E. Lucas, A. Kordts, M. H. P. Pfeiffer, V. Brasch, G. Lihachev, V. E. Lobanov, M. L. Gorodetsky, and T. J. Kippenberg, "Universal dynamics and deterministic switching of dissipative kerr solitons in optical microresonators," Nat. Phys. 13, 94 (2016).
[20] D. C. Cole, E. S. Lamb, P. Del'Haye, S. A. Diddams, and S. B. Papp, "Soliton crystals in kerr resonators," Nat. Photon. 11, 671 (2017).
[21] D. J. Jones, "Carrier-envelope phase control of femtosecond mode-locked lasers and direct optical frequency synthesis," Science 288, 635 (2000).
[22] M. Giunta, R. Holzwarth, M. Fischer, W. Hansel, T. Steinmetz, M. Lessing, S. Holzberger, C. Cleff, T. W. Hansch, and M. Mei, "20 years and 20 decimal digits: A journey with optical frequency combs," IEEE Photon. Technol. Lett. 31, 1898 (2019).
[23] D. T. Spencer, T. Drake, T. C. Briles, J. Stone, L. C. Sinclair, C. Fredrick, Q. Li, D. Westly, B. R. Ilic, A. Bluestone, N. Volet, T. Komljenovic, L. Chang, S. H. Lee, D. Y. Oh, M.-G. Suh, K. Y. Yang, M. H. P. Pfeiffer, T. J. Kippenberg, E. Norberg, L. Theogarajan, K. Vahala, N. R. Newbury, K. Srinivasan, J. E. Bowers, S. A. Diddams, and S. B. Papp, "An optical-frequency synthesizer using integrated photonics," Nature 557, 81 (2018). [24] Z. L. Newman, V. Maurice, T. Drake, J. R. Stone, T. C. Briles, D. T. Spencer, C. Fredrick, Q. Li, D. Westly, B. R. Ilic, B. Shen, M.-G. Suh, K. Y. Yang, C. Johnson, D. M. S. Johnson, L. Hollberg, K. J. Vahala, K. Srinivasan, S. A. Diddams, J. Kitching, S. B. Papp, and M. T. Hummon, "Architecture for the photonic integration of an optical atomic clock," Optica 6, 680 (2019).
[25] Q. Li, T. C. Briles, D. A. Westly, T. E. Drake, J. R. Stone, B. R. Ilic, S. A. Diddams, S. B. Papp, and K. Srinivasan, "Stably accessing octave-spanning microresonator frequency combs in the soliton regime," Optica 4, 193 (2017).
[26] M. H. P. Pfeiffer, C. Herkommer, J. Liu, H. Guo, M. Karpov, E. Lucas, M. Zervas, and T. J. Kippenberg, "Octave-spanning dissipative kerr soliton frequency combs in si 3n 4 microresonators," Optica 4, 684 (2017).

[27] S.-P. Yu, T. C. Briles, G. T. Moille, X. Lu, S. A. Diddams, K. Srinivasan, and S. B. Papp, "Tuning kerr-soliton frequency combs to atomic resonances," Phys. Rev. Appl. 11, 044017 (2019).

[28] T. E. Drake, T. C. Briles, J. R. Stone, D. T. Spencer, D. R. Carlson, D. D. Hickstein, Q. Li, D. Westly, K. Srinivasan, S. A. Diddams, and S. B. Papp, "Terahertz-rate kerr-microresonator optical clockwork," Phys. Rev. X 9, 031023 (2019).

[29] T. C. Briles, J. R. Stone, T. E. Drake, D. T. Spencer, C. Fredrick, Q. Li, D. Westly, B. R. Ilic, K. Srinivasan, S. A. Diddams, and S. B. Papp, "Interlocking kerrmicroresonator frequency combs for microwave to optical synthesis," Opt. Lett. 43, 2933 (2018).

[30] C. Xiong, W. H. Pernice, X. Sun, C. Schuck, K. Y. Fong, and H. X. Tang, "Aluminum nitride as a new material for chip-scale optomechanics and nonlinear optics," New J. Phys. 14, 095014 (2012).

[31] M. Kneissl, T.-Y. Seong, J. Han, and H. Amano, "The emergence and prospects of deep-ultraviolet light emitting diode technologies," Nat. Photon. 13, 233 (2019).

[32] S. G. Bishop, J. P. Hadden, F. Alzahrani, R. Hekmati, D. L. Huffaker, W. W. Langbein, and A. J. Bennett, "Room temperature quantum emitter in aluminum nitride," ACS Photonics 7, 1636 (2020).

[33] T.-J. Lu, B. Lienhard, K.-Y. Jeong, H. Moon, A. Iranmanesh, G. Grosso, and D. R. Englund, "Bright highpurity quantum emitters in aluminum nitride integrated photonics," ACS Photonics 7, 2650-(2020).

[34] A. W. Bruch, X. Liu, X. Guo, J. B. Surya, Z. Gong, L. Zhang, J. Wang, J. Yan, and H. X. Tang, "17000%/w second-harmonic conversion efficiency in single-crystalline aluminum nitride microresonators," Appl. Phys. Lett. 113, 131102 (2018).

[35] X. Liu, A. W. Bruch, J. Lu, Z. Gong, J. B. Surya, L. Zhang, J. Wang, J. Yan, and H. X. Tang, "Beyond 100 THz-spanning ultraviolet frequency combs in a noncentrosymmetric crystalline waveguide," Nat. Commun. 10, 2971 (2019). [36] A. W. Bruch, X. Liu, Z. Gong, J. B. Surya, M. Li, C.-L. Zou, and H. X. Tang, "Pockels soliton microcomb," Nat. Photon. (2020), 10.1038/s41566-020-00704-8. [37] L. Chang, A. Boes, X. Guo, D. T. Spencer, M. J. Kennedy, J. D. Peters, N. Volet, J. Chiles, A. Kowligy, N. Nader, D. D. Hickstein, E. J. Stanton, S. A. Diddams, S. B. Papp, and J. E. Bowers, "Heterogeneously integrated gaas waveguides on insulator for efficient frequency conversion," Laser & Photon. Rev. 12, 1800149 (2018).

[38] D. D. Hickstein, H. Jung, D. R. Carlson, A. Lind, I. Coddington, K. Srinivasan, G. G. Ycas, D. C. Cole, A. Kowligy, C. Fredrick, S. Droste, E. S. Lamb, N. R. Newbury, H. X. Tang, S. A. Diddams, and S. B. Papp, "Ultrabroadband supercontinuum generation and frequency-comb stabilization using on-chip waveguides with both cubic and quadratic nonlinearities," Phys. Rev. Appl. 8, 014025 (2017).

[39] M. Yu, B. Desiatov, Y. Okawachi, A. L. Gaeta, and M. Lon car, "Coherent two-octave-spanning supercontinuum generation in lithium-niobate waveguides," Opt. Lett. 44, 1222 (2019).

[40] Y. Okawachi, M. Yu, B. Desiatov, B. Y. Kim, T. Hansson, M. Lončar, and A. L. Gaeta, "Chip-based selfreferencing using integrated lithium niobate waveguides," Optica 7, 702 (2020).

[41] X. Liu, C. Sun, B. Xiong, L. Wang, J. Wang, Y. Han, Z. Hao, H. Li, Y. Luo, J. Yan, et al., "Integrated continuous-wave aluminum nitride raman laser," Optica 4, 893 (2017).

[42] X. Liu, C. Sun, B. Xiong, L. Wang, J. Wang, Y. Han, Z. Hao, H. Li, Y. Luo, J. Yan, et al., "Integrated high-q crystalline aln microresonators for broadband kerr and raman frequency combs," ACS Photonics 5, 1943 (2018).

[43] X. Liu, A. W. Bruch, Z. Gong, J. Lu, J. B. Surya, L. Zhang, J. Wang, J. Yan, and H. X. Tang, "Ultra-highq uv microring resonators based on a single-crystalline aln platform," Optica 5, 1279 (2018).

[44] A. Majki'c, A. Franke, R. Kirste, R. Schlesser, R. Collazo, Z. Sitar, and M. Zgonik, "Optical nonlinear and electro-optical coefficients in bulk aluminium nitride single crystals," Phys. Status Solidi B 254, 1700077 (2017).

[45] M. Karpov, H. Guo, A. Kordts, V. Brasch, M. H. Pfeiffer, M. Zervas, M. Geiselmann, and T. J. Kippenberg, "Raman self-frequency shift of dissipative kerr solitons in an optical microresonator," Phys. Rev. Lett. 116, 103902 (2016).

[46] Z. Gong, X. Liu, Y. Xu, and H. X. Tang, "Nearoctave lithium niobate soliton microcomb," Optica 7, 1275 (2020).

[47] S. Zhang, J. M. Silver, X. Shang, L. Del Bino, N. M. Ridler, and P. Del'Haye, "Terahertz wave generation using a soliton microcomb," Opt. Express 27, 35257 (2019).

[48] X. Yi, Q.-F. Yang, X. Zhang, K. Y. Yang, X. Li, and K. Vahala, "Single-mode dispersive waves and soliton microcomb dynamics," Nat. Commun. 8, 14869 (2017).

[49] A. W. Bruch, X. Liu, J. B. Surya, C.-L. Zou, and H. X. Tang, "On-chip $X^{(2)}$ microring optical parametric oscillator," Optica 6, 1361 (2019).

[50] J. B. Surya, X. Guo, C.-L. Zou, and H. X. Tang, "Control of second-harmonic generation in doubly resonant aluminum nitride microrings to address a rubidium twophoton clock transition," Opt. Lett. 43, 2696 (2018).

[51] J. Li, X. Yi, H. Lee, S. A. Diddams, and K. J. Vahala, "Electro-optical frequency division and stable microwave synthesis," Science 345, 309 (2014).

[52] D. J. Wilson, K. Schneider, S. Hönl, M. Anderson, Y. Baumgartner, L. Czornomaz, T. J. Kippenberg, and P. Seidler, "Integrated gallium phosphide nonlinear photonics," Nat. Photon. 14, 57 (2019).

[53] J. Lu, J. B. Surya, X. Liu, A. W. Bruch, Z. Gong, Y. Xu, and H. X. Tang, "Periodically poled thin-film lithium niobate microring resonators with a second-harmonic generation efficiency of 250,000%/w," Optica 6, 1455 (2019).

[54] Z. Gong, M. Li, X. Liu, Y. Xu, J. Lu, A. Bruch, J. B. Surya, C. Zou, and H. X. Tang, "Photonic dissipation control for kerr soliton generation in strongly ramanactive media," Phys. Rev. Lett. 125, 183901 (2020).

[55] M. Zhang, C. Wang, R. Cheng, A. Shams-Ansari, and M. Lon car. "Monolithic ultra-high-Q lithium niobate microring resonator". Optica 4(12), 1536-1537 (2017)

[56] Z. Gong, X. Liu, Y. Xu, and H. X. Tang. "Near-octave lithium niobate soliton microcomb". Optica 7(10), 1275-1278 (2020). [S3] T. Herr, V. Brasch, J. D. Jost, I. Mirgorodskiy, G. Lihachev, M. L. Gorodetsky, and T. J. Kippenberg. "Mode Spectrum and Temporal Soliton Formation in Optical Microresonators". Phys. Rev. Lett. 113, 123901 (2014).

[57] X. Liu, C. Sun, B. Xiong, L. Wang, J. Wang, Y. Han, Z. Hao, H. Li, Y. Luo, J. Yan, T. Wei, Y. Zhang, and J. Wang.

"Integrated continuous-wave aluminum nitride Raman laser". Optica 4(8), 893-896 (2017).

[58] T. Herr, V. Brasch, J. D. Jost, C. Y. Wang, N. M. Kondratiev, M. L. Gorodetsky, and T. J. Kippenberg. "Temporal solitons in optical microresonators". Nat. Photon. 8, 145-152 (2014).

[59] Z. Gong, A. Bruch, M. Shen, X. Guo, H. Jung, L. Fan, X. Liu, L. Zhang, J. Wang, J. Li, J. Yan, and H. X. Tang. "High-fidelity cavity soliton generation in crystalline AlN micro-ring resonators". Opt. Lett. 43(18), 4366–4369 (2018).

[60] X. Liu, C. Sun, B. Xiong, L. Wang, J. Wang, Y. Han, Z. Hao, H. Li, Y. Luo, J. Yan, T. Wei, Y. Zhang, and J. Wang. "Generation of multiple near-visible comb lines in an AlN microring via $X^{(2)}$ and $X^{(3)}$ optical nonlinearities". Appl. Phys. Lett. 113(17), 171106 (2018).

[61] A. W. Bruch, X. Liu, X. Guo, J. B. Surya, Z. Gong, L. Zhang, J. Wang, J. Yan, and H. X. Tang. "17,000%/w second-harmonic conversion efficiency in single-crystalline aluminum nitride microresonators". Appl. Phys. Lett. 113(13), 131102 (2018).

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. An octave-spanning optical frequency comb device, comprising:
    an optical pathway having at least one entry and at least one exit;
    at least one laser source positioned at the at least one entry; and
    at least one microring resonator positioned adjacent to the optical pathway between the at least one entry and the at least one exit, wherein the at least one microring resonator comprises aluminum nitride (AlN) and wherein the device comprises an intrinsic optical Q factor of at least 3,000,000.

2. The device of claim 1, wherein the at least one laser source is a continuous wave (CW) laser.

3. The device of claim 1, wherein the optical pathway further comprises a suppressed carrier single sideband modulator (SC-SSBM) positioned between the at least one laser source and the at least one microring resonator.

4. The device of claim 1, wherein the optical pathway further comprises an amplifier positioned between the at least one laser source and the at least one microring resonator.

5. The device of claim 4, wherein the amplifier is an erbium-doped fiber amplifier (EDFA).

6. The device of claim 1, wherein the optical pathway further comprises a fiber polarization controller (FPC) positioned between the at least one laser source and the at least one microring resonator.

7. The device of claim 1, wherein the at least one microring resonator comprises an oxide cladding.

8. The device of claim 7, wherein the oxide cladding is silicon oxide.

9. The device of claim 1, wherein the at least one microring resonator comprises a ring width and a ring radius.

10. The device of claim 9, wherein the ring width is between about 0.5 µm to about 100 µm.

11. The device of claim 9, wherein the ring radius is between about 10 µm to about 1000 µm.

12. The device of claim 1, wherein the at least one microring resonator is fabricated by chemical vapor deposition of an AlN thin film on a substrate.

13. The device of claim 12, wherein the chemical vapor deposition is metalorganic chemical vapor deposition (MOCVD).

14. The device of claim 12, wherein the substrate is sapphire.

15. The device of claim 12, wherein the AlN thin film comprises at least 0.5% thickness uniformity.

16. The device of claim 12, wherein the AlN thin film comprises an annealing temperature of about 1700° C.

17. The device of claim 1, wherein the at least one microring resonator comprises a ring width of 2.5 µm, a ring radius of 60 µm, a repetition frequency $f_{rep}$ of 362 GHz, and a comb span of 1.2 octave.

18. The device of claim 1, wherein the at least one microring resonator comprises a ring width of 3.3 µm, a ring radius of 100 µm, a repetition frequency $f_{rep}$ of 216.5 GHz, and a comb span of 1.1 octave.

19. The device of claim 1, wherein the comb span is at least 1.5 octaves.

20. The device of claim 1, further comprising an electro-optical comb for repetition comprising a waveguide in resonance with the at least one microring resonator, at least one frequency second harmonic generation doubler, and a racetrack resonator.

21. An octave-spanning optical frequency comb device, comprising:
    an optical pathway having at least one entry and at least one exit;
    at least one laser source positioned at the at least one entry; and
    at least one microring resonator positioned adjacent to the optical pathway between the at least one entry and the at least one exit, wherein the at least one microring resonator comprises aluminum nitride (AlN) and wherein the comb span is at least 1.5 octaves.

* * * * *